(12) United States Patent
Sugano

(10) Patent No.: US 6,937,401 B2
(45) Date of Patent: Aug. 30, 2005

(54) PROJECTION LENS

(75) Inventor: Yasuyuki Sugano, Gunma (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 10/484,857

(22) PCT Filed: Aug. 28, 2002

(86) PCT No.: PCT/JP02/08657
§ 371 (c)(1),
(2), (4) Date: Jan. 23, 2004

(87) PCT Pub. No.: WO03/021326
PCT Pub. Date: Mar. 13, 2003

(65) Prior Publication Data
US 2004/0233547 A1 Nov. 25, 2004

(30) Foreign Application Priority Data
Aug. 28, 2001 (JP) ........................................ 2001-258080

(51) Int. Cl.[7] .......................... G02B 13/00; G02B 13/18
(52) U.S. Cl. ...................................... 359/649; 359/708
(58) Field of Search ................................ 359/649, 663, 359/708

(56) References Cited

U.S. PATENT DOCUMENTS 5,303,087 A * 4/1994 Hayakawa et al. ......... 359/708
5,390,048 A * 2/1995 Miyatake et al. .......... 359/650
5,745,297 A 4/1998 Kaneko et al. ............. 359/651
6,473,244 B1 * 10/2002 Sugano ...................... 359/794

FOREIGN PATENT DOCUMENTS

EP           0952474        10/1999

* cited by examiner

Primary Examiner—Scott J. Sugarman
(74) Attorney, Agent, or Firm—Jay H. Maioli

(57) ABSTRACT

A projection lens of the retrofocus type that has a long back focus and that can project with a high contrast, exhibits small aberrations and converts a light path inside the lens. A first lens set having a negative refractive power, a light path converter, and an iris and a second lens set having a positive refractive power and an aspheric lens are disposed in order from the screen side. The first lens set includes a lens set having a negative refractive power and one or more aspheric lenses, a bending mirror serving as the light path converter, and a lens set having a positive refractive power. The lenses in the first lens set have an outer shape with a portion thereof cut outside an effective light ray in a direction of the light path conversion, and the direction of the light path conversion is a direction of a shorter side of rectangular image formation element.

26 Claims, 25 Drawing Sheets

F I G. 4
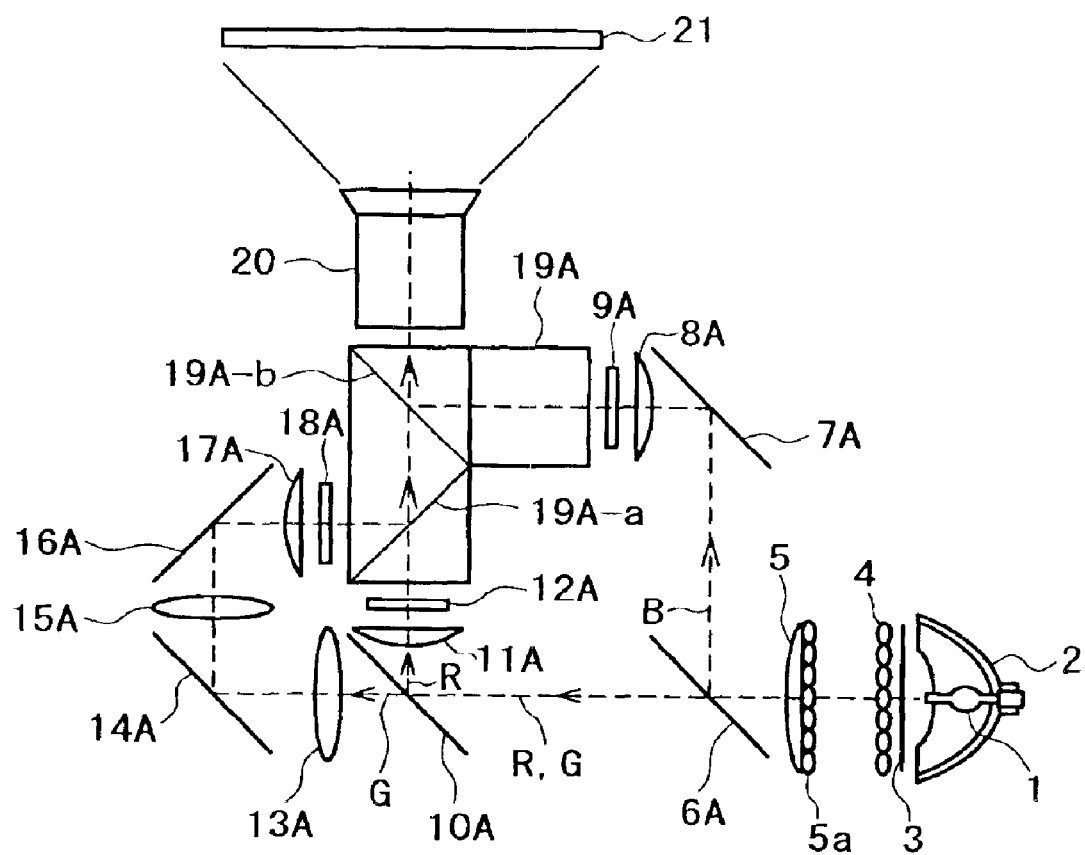

FIG. 15A

FL=17.2722 M=-0.026 FNo=2.4 2W=91.92 PROJECTION DISTANCE=617.0336mm

| SURFACE NUMBER | RADIUS OF CURVATURE | SURFACE DISTANCE | REFRACTIVE INDEX | ABBE NUMBER |
|---|---|---|---|---|
| 1 | 137.24124 | 5.0000 | 1.69680 | 55.62 |
| 2 | 42.93369 | 7.1047 | | |
| 3 | 60.00000 | 5.0000 | 1.49040 | 57.69 |
| ④ | 22.06536 | 49.9620 | | |
| 5 | INFINITY | 24.0000 | | |
| 6 | 52.98733 | 5.2203 | 1.77039 | 26.63 |
| 7 | -343.84500 | 7.3006 | | |
| 8 | INFINITY | 13.4961 | | |
| 9 | -62.49758 | 2.0000 | 1.80500 | 25.44 |
| 10 | -267.10185 | 3.3032 | | |
| 11 | -96.76381 | 5.0000 | 1.49040 | 57.69 |
| ⑫ | -43.83469 | 2.2956 | | |
| 13 | -65.71009 | 2.5000 | 1.80518 | 25.43 |
| 14 | 50.62035 | 12.0000 | 1.48749 | 70.15 |
| 15 | -47.14268 | 0.2000 | | |
| 16 | -136.60151 | 8.9167 | 1.48749 | 70.15 |
| 17 | -38.81889 | 0.2000 | | |
| 18 | 125.70676 | 14.0000 | 1.48749 | 70.15 |
| 19 | -50.49821 | 10.0000 | | |
| 20 | INFINITY | 50.0000 | 1.51633 | 64.15 |
| 21 | INFINITY | 0.0041 | | |

FIG. 15B

| ASPHERIC SURFACE | FOURTH SURFACE |
|---|---|
| K | 0.7242805363099 |
| A4 | 0.2274473861689E05 |
| A6 | 0.3779497568884E08 |
| A8 | 0.2628812752234E11 |
| A10 | 0.1974037532679E14 |

FIG. 15C

| ASPHERIC SURFACE | TWELFTH SURFACE |
|---|---|
| K | 2.530407393963 |
| A4 | 0.1730414384794E-04 |
| A6 | 0.6639419574445E-08 |
| A8 | -0.1149154899941E-11 |
| A10 | -0.2267473194484E-14 |

FIG. 16A

FL=17.3000  M=-0.032016  FNo=2.4  2W=91.71  PROJECTION DISTANCE=500.000mm

| SURFACE NUMBER | RADIUS OF CURVATURE | SURFACE DISTANCE | REFRACTIVE INDEX | ABBE NUMBER |
|---|---|---|---|---|
| 1 | 89.94666 | 4.3000 | 1.69680 | 55.62 |
| 2 | 40.50595 | 14.1217 | | |
| 3 | 129.63819 | 4.0000 | 1.49150 | 58.00 |
| ④ | 27.74673 | 45.2000 | | |
| 5 | INFINITY | 23.0000 | | |
| 6 | 39.45816 | 4.1976 | 1.84666 | 23.88 |
| 7 | 89.07616 | 3.6532 | | |
| 8 | INFINITY | 17.9601 | | |
| ⑨ | -78.41113 | 5.0433 | 1.49150 | 58.00 |
| ⑩ | 64.08803 | 2.9735 | | |
| 11 | 63.27398 | 14.0000 | 1.48749 | 70.15 |
| 12 | -33.47039 | 0.2000 | | |
| 13 | -151.64409 | 2.5000 | 1.84666 | 23.88 |
| 14 | 45.23595 | 14.0000 | 1.48749 | 70.15 |
| 15 | -54.21914 | 0.2000 | | |
| 16 | 153.34025 | 9.0196 | 1.77250 | 49.57 |
| 17 | -83.96324 | 10.0000 | | |
| 18 | INFINITY | 50.0000 | 1.51633 | 64.15 |
| 19 | INFINITY | 0.0 | | |

FIG. 16B

| ASPHERIC SURFACE | FOURTH SURFACE |
|---|---|
| K | 0.3180645845035 |
| A4 | 0.5553290498455E05 |
| A6 | 0.6501738392812E08 |
| A8 | 0.6772538033228E11 |
| A10 | 0.6442961631300E14 |

FIG. 16C

| ASPHERIC SURFACE | NINETH SURFACE |
|---|---|
| K | 0.2644349480327E+01 |
| A4 | -0.1284873417049E-04 |
| A6 | -0.2249626185924E-07 |
| A8 | -0.8903147862617E-10 |
| A10 | 0.4805514056096E-12 |

FIG. 16D

| ASPHERIC SURFACE | TENTH SURFACE |
|---|---|
| K | 0.9099668166771E+01 |
| A4 | -0.9447851283114E-06 |
| A6 | -0.3730688380311E-07 |
| A8 | 0.1146844636435E-09 |
| A10 | -0.1781471836785E-12 |

FIG. 17A

FL=17.2991 M=-0.027005 FNo=2.4 2W=91.71 PROJECTION DISTANCE=600.000mm

| SURFACE NUMBER | RADIUS OF CURVATURE | SURFACE DISTANCE | REFRACTIVE INDEX | ABBE NUMBER |
|---|---|---|---|---|
| 1 | 144.63604 | 4.3000 | 1.51633 | 64.15 |
| 2 | 39.69307 | 13.7858 | | |
| 3 | 125.08400 | 4.0000 | 1.49150 | 58.00 |
| ④ | 27.58594 | 44.1885 | | |
| 5 | INFINITY | 23.0000 | | |
| 6 | 48.34384 | 5.0116 | 1.80194 | 25.53 |
| 7 | 494.93694 | 8.4837 | | |
| 8 | INFINITY | 19.3921 | | |
| 9 | -33.66892 | 2.3834 | 1.80500 | 25.97 |
| 10 | 39.10195 | 7.9127 | 1.60000 | 60.80 |
| 11 | -141.85092 | 0.2000 | | |
| 12 | 64.61103 | 7.3200 | 1.51633 | 64.15 |
| 13 | -962.47649 | 2.1669 | | |
| 14 | 73.44868 | 14.0000 | 1.48749 | 70.15 |
| 15 | -58.15057 | 0.2000 | | |
| ⑯ | 121.17699 | 8.6000 | 1.49150 | 58.00 |
| ⑰ | -53.15149 | 10.0000 | | |
| 18 | INFINITY | 50.0000 | 1.51633 | 64.15 |
| 19 | INFINITY | 0.4654 | | |

FIG. 17B

| ASPHERIC SURFACE | FOURTH SURFACE |
|---|---|
| K | 0.3538601139490 |
| A4 | 0.5600561973535E05 |
| A6 | 0.4724973202655E08 |
| A8 | 0.4714112940777E11 |
| A10 | 0.4972026279967E14 |

FIG. 17C

| ASPHERIC SURFACE | SIXTEENTH SURFACE |
|---|---|
| K | 1.000000000000 |
| A4 | -0.4313413253080E-05 |
| A6 | -0.1577218029135E-07 |
| A8 | 0.2085495837484E-10 |
| A10 | -0.6297082381912E-14 |

FIG. 17D

| ASPHERIC SURFACE | SEVENTEENTH SURFACE |
|---|---|
| K | 0.2211488308556 |
| A4 | 0.3889109476411E-05 |
| A6 | -0.1592011823986E-07 |
| A8 | 0.2286671202433E-10 |
| A10 | -0.6288711877152E-14 |

FIG. 18A

FL=17.3000 M=-0.026975 FNo=2.4 2W=91.45 PROJECTION DISTANCE=600.000mm

| SURFACE NUMBER | RADIUS OF CURVATURE | SURFACE DISTANCE | REFRACTIVE INDEX | ABBE NUMBER |
|---|---|---|---|---|
| 1 | 105.19280 | 4.3000 | 1.69680 | 55.62 |
| 2 | 41.06577 | 16.7371 | | |
| 3 | 113.61553 | 4.0000 | 1.49150 | 58.00 |
| ④ | 26.90443 | 45.6386 | | |
| 5 | INFINITY | 23.0000 | | |
| 6 | 45.42676 | 5.4934 | 1.81138 | 24.89 |
| 7 | 275.71372 | 11.3503 | | |
| 8 | INFINITY | 17.4620 | | |
| 9 | -34.98351 | 2.3834 | 1.80500 | 25.44 |
| 10 | 37.37701 | 7.6163 | 1.60000 | 60.80 |
| 11 | -165.22113 | 0.2000 | | |
| 12 | 53.86999 | 8.7424 | 1.51633 | 64.15 |
| 13 | -260.10184 | 7.2143 | | |
| 14 | 61.20722 | 11.8104 | 1.48749 | 70.15 |
| 15 | -124.63873 | 0.2000 | | |
| ⑯ | 103.72896 | 8.6000 | 1.49150 | 58.00 |
| ⑰ | -58.11091 | 10.0000 | | |
| 18 | INFINITY | 50.0000 | 1.51633 | 64.15 |
| 19 | INFINITY | 0.4667 | | |

FIG. 18B

| ASPHERIC SURFACE | FOURTH SURFACE |
|---|---|
| K | -0.4077142295020 |
| A4 | -0.5714574401804E-05 |
| A6 | -0.3902822578141E-08 |
| A8 | 0.2928312163684E-11 |
| A10 | -0.3697035214989E-14 |

FIG. 18C

| ASPHERIC SURFACE | SIXTEENTH SURFACE |
|---|---|
| K | 1.000000000000 |
| A4 | -0.3724802470364E-05 |
| A6 | -0.1381641144902E-07 |
| A8 | 0.2082647802026E-10 |
| A10 | -0.7296183307200E-14 |

FIG. 18D

| ASPHERIC SURFACE | SEVENTEENTH SURFACE |
|---|---|
| K | 0.3047467121578 |
| A4 | 0.4646086033787E-05 |
| A6 | -0.1487081694304E-07 |
| A8 | 0.2323663825737E-10 |
| A10 | -0.7354373968565E-14 |

FIG. 19A

FL=17.3002 M=-0.032124 FNo=2.4 2W=92.16 PROJECTION DISTANCE=500.000mm

| SURFACE NUMBER | RADIUS OF CURVATURE | SURFACE DISTANCE | REFRACTIVE INDEX | ABBE NUMBER |
|---|---|---|---|---|
| 1 | 114.79467 | 4.3000 | 1.15633 | 64.15 |
| 2 | 39.83641 | 12.3660 | | |
| 3 | 133.21110 | 4.0000 | 1.49150 | 58.00 |
| ④ | 22.99099 | 44.8656 | | |
| 5 | INFINITY | 23.0000 | | |
| 6 | 73.69921 | 4.2079 | 1.80500 | 25.44 |
| 7 | -511.71326 | 2.6264 | | |
| 8 | INFINITY | 25.1972 | | |
| 9 | 170.50397 | 4.6210 | 1.51633 | 64.15 |
| 10 | -86.19695 | 4.4336 | | |
| 11 | -38.54878 | 2.3834 | 1.80518 | 25.43 |
| 12 | 64.83954 | 9.1306 | 1.48750 | 70.15 |
| 13 | -78.51689 | 0.2000 | | |
| 14 | 56.55403 | 16.4689 | 1.48750 | 70.15 |
| 15 | -53.09817 | 0.2000 | | |
| ⑯ | -133.26908 | 8.6000 | 1.49150 | 58.00 |
| ⑰ | -35.85040 | 10.0000 | | |
| 18 | INFINITY | 50.0000 | 1.51633 | 64.15 |
| 19 | INFINITY | 0.5557 | | |

FIG. 19B

| ASPHERIC SURFACE | FOURTH SURFACE |
|---|---|
| K | -0.4218945782027 |
| A4 | -0.5784661853987E-05 |
| A6 | -0.1018616233039E-07 |
| A8 | 0.1555596338816E-10 |
| A10 | -0.1834804933867E-13 |

FIG. 19C

| ASPHERIC SURFACE | SIXTEENTH SURFACE |
|---|---|
| K | 1.000000000000 |
| A4 | -0.5882935072753E-05 |
| A6 | -0.1323088467195E-07 |
| A8 | 0.5082366669297E-10 |
| A10 | -0.2969517742842E-13 |

FIG. 19D

| ASPHERIC SURFACE | SEVENTEENTH SURFACE |
|---|---|
| K | -0.1788995967428 |
| A4 | 0.2938816850754E-05 |
| A6 | -0.1070366939477E-07 |
| A8 | 0.3816189222645E-10 |
| A10 | -0.1341490224524E-13 |

FIG. 20

CULCULATION VALUES OF CONDITIONAL EXPRESSIONS

| CONDITIONAL EXPRESSION | FIRST EMBODIMENT | SECOND EMBODIMENT | THIRD EMBODIMENT | FOURTH EMBODIMENT | FIFTH EMBODIMENT |
|---|---|---|---|---|---|
| (1) | 2.459 | 2.482 | 2.482 | 2.482 | 2.482 |
| (2) | 0.837 | 0.866 | 0.795 | 0.817 | 0.714 |
| (3) | 4.282 | 3.942 | 3.884 | 3.968 | 3.923 |
| (4) | 2.217 | 2.321 | 2.296 | 2.183 | 2.069 |

# PROJECTION LENS

TECHNICAL FIELD

This invention relates to a projection lens and is suitably applied to a projection lens provided, for example, in a projection apparatus of a projection display apparatus or a like apparatus.

BACKGROUND ART

In recent years, projection display apparatus have been popularized widely.

As one of such projection display apparatus as just mentioned, a projection display apparatus of the back projection type which projects image light to a screen of the transmission type from the rear side of the screen is known.

In such a projection display apparatus of the back projection type as just described, for example, light of a white light source is collimated into a light flux by a reflector a like element, and the light flux is separated into light fluxes of three colors of red, green and blue by color separation mirrors.

Then, the light fluxes of the three colors are introduced into two-dimensional image display elements (for example, LCD units; Liquid Crystal Display units) formed in accordance with image electric signals of red, green and blue (R, G, B). The image lights obtained on the two-dimensional image display elements corresponding to red, green and blue are color-synthesized into white light by a color synthesis optical system and projected in an enlarged scale on a screen of the transmission type through a projection lens.

It is to be noted that, for a lens having a similar configuration, a great number of lenses including photographic objective lenses of the wide angle type for a single-lens reflect camera having a long back focus and wide angle projection lenses for a projection television which uses a CRT (Cathode Ray Tube) have been proposed taking limitations by a quick return mirror and so forth into consideration.

Further, in a projection display apparatus, a lens system which forms a projection lens sometimes has a structure for converting a light path.

The structure makes it possible to change the arrangement direction of a housing of a projection apparatus in a projection apparatus or an arrangement direction of each of various optical elements from the color separation to the color synthesis in the inside of a projection apparatus or miniaturize the various optical elements, thereby achieving miniaturization of the projection display apparatus.

Particularly in projection display apparatus in recent years, since a demand for achievement of higher definition of a projected image and for miniaturization of an entire apparatus is increasing, a wider angle and a higher optical performance are demanded also for a projection lens.

However, with such a configuration of a projection display apparatus as described above, from a limitation arising from the necessity to dispose an optical element such as a dichroic prism or a dichroic mirror as a color synthesis optical system, a rather long back focus which corresponds to the distance from the two-dimensional image display element to the last end of the projection lens must be assured.

Where a projection display apparatus forms an enlarged image on an entire screen of the transmission type using a single projection apparatus, in order to make the projection display apparatus itself compact, it is necessary to reduce the projection distance (typically the length of a center light beam from an outgoing end of the projection lens to the transmission type screen through a mirror). To this end, it is necessary to form the projection lens as a wide angle projection lens to increase the angle of divergence of outgoing light from the projection lens to obtain a large image plane.

Further, in order for the two-dimensional image display element to pass light incoming from the light source therethrough to project an image on the two-dimensional image display element in an enlarged scale and in a high contrast on the screen, it is necessary to utilize a light flux which comes out at an angle proximate to a perpendicular from the two-dimensional image display element.

Accordingly, the projection lens must have a telecentric property so that an off-axis principal ray of the projection lens may be perpendicular to the two-dimensional image display element.

Further, while a display device such as an LCD unit is normally used as the two-dimensional image display element, since the LCD unit is driven using matrix electrodes, it is difficult to correct the distortion of the projection lens, different from an alternative case wherein a CRT is used. In particular, where a CRT is used, the distortion of the projection lens can be corrected comparatively readily by utilization of a raster-shape correction function such as bobbin-like distortion correction. However, where a display device which displays in a dot matrix like an LCD unit is used, such raster distortion correction as described above is not performed usually.

From such a situation as described above, preferably the distortion aberration of the projection lens is minimized. However, this makes an obstacle to formation of the projection lens as a wide angle lens and achievement of a long back focus.

In short, it is known that, if a telecentric property is provided to the projection lens while a wide angle and a long back focus are assured, then this provides a tendency that the overall length of the lens increases or the lens diameter increases.

Further, if the lens system which forms the projection lens adopts a structure which converts the light path as described above, then it is possible to suppress the height and reduce the depthwise dimension of the projection display apparatus. As a result, miniaturization of the projection display apparatus can be achieved. In recent years, however, further miniaturization is demanded also for a projection display apparatus which includes a projection lens which performs such light path conversion as described above. Also increase in definition of a projected image is promoted.

DISCLOSURE OF INVENTION

Therefore, it is an object of the present invention to make it possible for a projection lens, which involves conversion of a light path in a system thereof, to have a wide angle of view, a short projection distance, a long back focus, a great amount of off-axis light and a telecentric property and besides have a small distortion aberration and small other aberrations in order to solve the subject described above.

In order to attain the object described above, a projection lens which receives a synthesized light formed by separating light from a light source into a plurality of color lights, forming each of the separated color lights as an image color light by means of an image formation element and synthesizing the image color lights and projects the received synthesized light in an enlarged scale on a screen is configured in the following manner.

The projection lens of the present invention is formed as a projection lens of the retrofocus type wherein a first lens set having a negative refractive power and having light path conversion means built therein, an iris and a second lens set having a positive refractive power are disposed in order from the screen side to the panel side.

The first lens set includes a first A lens set having a negative refractive power and including at least one or more aspheric lenses, the light path conversion means, and a first B lens set having a positive refractive power. Meanwhile, the second lens set at least includes an aspheric lens.

The lenses in the first A lens set have an outer diameter with a portion thereof cut outside an effective light ray in a direction of the light path conversion, and the direction of the light path conversion by the light path conversion means is a direction of a shorter side of the rectangular image formation element.

Further, where the focal length of the entire system is represented by FL, the back focus by FB, the front side focal position of the second lens set by FFP2, the distance between the iris and the second lens set by Dst, and the air converted distance on the optical axis between the first lens set and the second lens set by D2, conditional expressions $FB/FL>2.2$ $0.59<|FFP2/Dst|<0.96$ $3.75<D2$ are satisfied.

Meanwhile, another projection lens which receives a synthesized light formed by separating light from a light source into a plurality of color lights, forming each of the separated color lights as an image color light by means of an image formation element and synthesizing the image color lights and projects the received synthesized light in an enlarged scale on a screen is configured in the following manner.

The projection lens is formed as a projection lens of the retrofocus type wherein a first lens set having a negative refractive power and having light path conversion means built therein, an iris and a second lens set having a positive refractive power are disposed in order from the screen side to the panel side.

The first lens set includes a first A lens set having a negative refractive power and including at least one or more aspheric lenses, the light path conversion means, and a first B lens set having a positive refractive power. Meanwhile, the second lens set at least includes an aspheric lens.

The lenses in the first A lens set have an outer diameter with a portion thereof cut outside an effective light ray in a direction perpendicular to the direction of the light path conversion, and the direction of the light path conversion by the light path conversion means is a direction of a longer side of the rectangular image formation element.

Further, where the focal length of the entire system is represented by FL, the back focus by FB, the front side focal position of the second lens set by FFP2, the distance between the iris and the second lens set by Dst, and the air converted distance on the optical axis between the first lens set and the second lens set by D2, conditional expressions $FB/FL>2.2$ $0.59<|FFP2/Dst|<0.96$ $3.75<D2$ are satisfied.

According to each of the configurations described above, the projection lens of the present invention includes light path conversion means in the inside thereof. Where the projection lens includes the lens arrangement of the configuration and satisfies the conditional expressions, requirements for obtaining a projection lens wherein a small projection distance is assured and a telecentric property is maintained while the angle of view is great and the back focus is long are satisfied.

BRIEF DESCRIPTION OF DRAWINGS

FIG. 4 is a view showing an internal configuration (second example) of the projection display apparatus which includes the projection lens according to the embodiment of the present invention;

FIGS. 15A to 15C are views illustrating a numerical value embodiment of the projection lens as the first embodiment;

FIGS. 16A to 16D are views illustrating a numerical value embodiment of the projection lens as the second embodiment;

FIGS. 17A to 17D are views illustrating a numerical value embodiment of the projection lens as the third embodiment;

FIGS. 18A to 18D are views illustrating a numerical value embodiment of the projection lens as the fourth embodiment;

FIGS. 19A to 19D are views illustrating a numerical value embodiment of the projection lens as the fifth embodiment;

FIG. 20 is a view illustrating calculation value examples regarding conditional expressions (1) to (4) in the first to fifth embodiments;

BEST MODE FOR CARRYING OUT THE INVENTION

In the following, projection lenses of embodiments of the present invention are described. In the following description, the projection lenses of the embodiments are provided in a projection apparatus of a projection display apparatus of the back projection type wherein an LCD unit is adopted as a two-dimensional image display element.

It is to be noted that the description below is given in the following order.

1. Configuration of the Projection Display Apparatus
   1-1. General Configuration (First Example)
   1-2. General Configuration (Second Example)
   1-3. Internal Configuration of the Projection Apparatus (First Example)
   1-4. Internal Configuration of the Projection Apparatus (Second Example)
   1-5. Internal Configuration of the Projection Apparatus (Third Example)
2. Lens
3. Configuration of the Projection Lens
   3-1. Arrangement Structure of Lenses
   3-2. Conditional Expressions
   3-3. Numerical Value Embodiments, etc.

1. Configuration of the Projection Display Apparatus
   1-1. General Configuration (Example 1)

First, description is given of a general configuration of a projection display apparatus which can incorporate a projection apparatus which includes a projection lens of the present embodiment.

Figure 1:
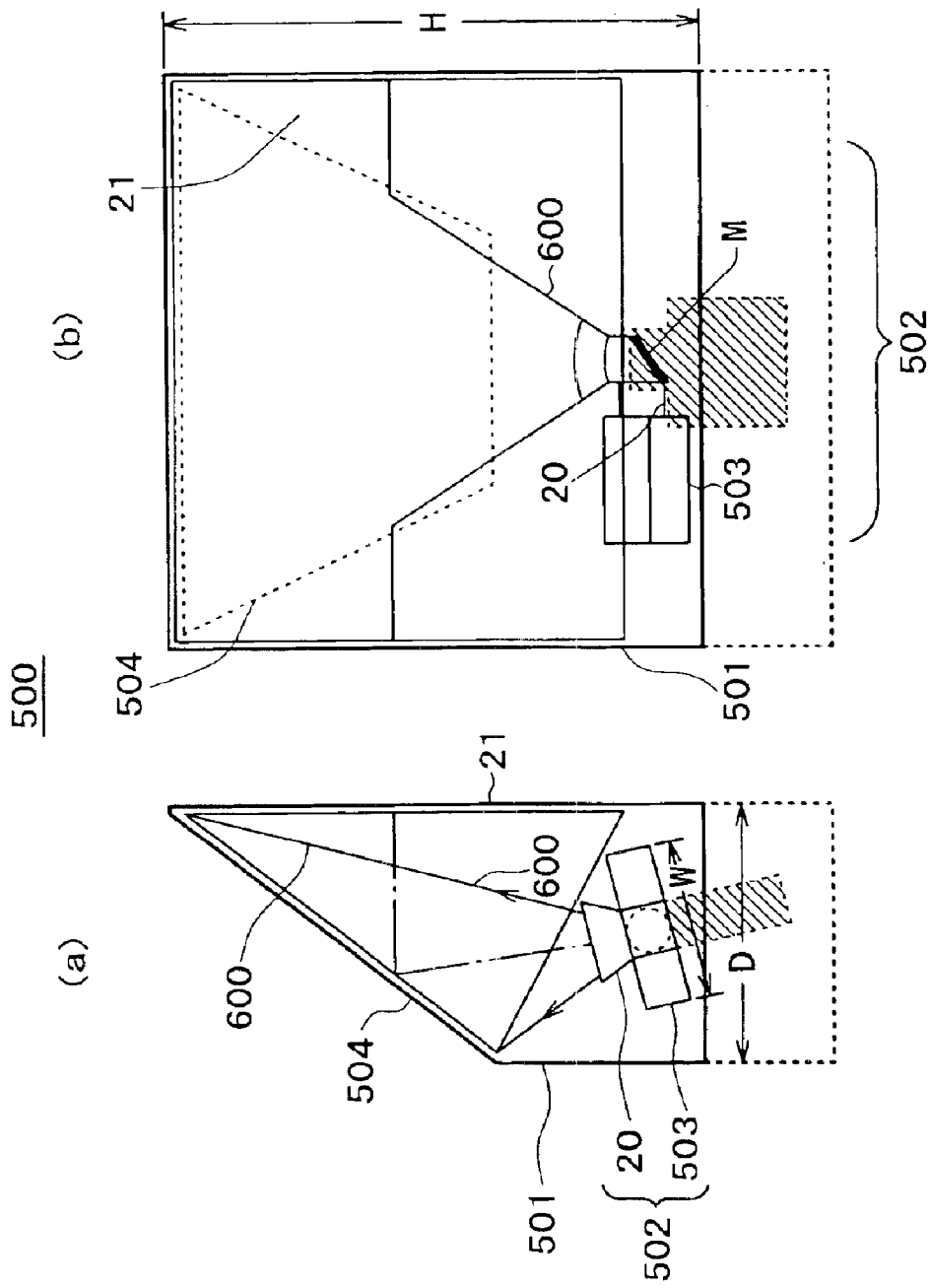
FIG. 1 is a view showing a general configuration (first example) of a projection display apparatus which includes a projection lens according to an embodiment of the present invention.

(a) and (b) of FIG. 1 are a side elevational view and a front elevational view, respectively, showing a first example of a general configuration of such a projection display apparatus as just mentioned.

In the projection display apparatus 500 shown in the figures, a bending mirror 504 is provided on the back of a cabinet 501 of the projection display apparatus 500, and a screen 21 of the transmission type is provided on the front of the cabinet 501. The bending mirror 504 is mounted with an angle with which it can reflect image light projected from a projection apparatus 502 described below so that the image light can be projected to the screen 21.

The projection apparatus 502 is disposed on the lower side in such a manner as indicated by solid lines of the figures within the cabinet 501. Here, slanting lines indicate a conventional projection apparatus.

Optical parts such as a light source, a dichroic mirror, a liquid crystal panel block and a dichroic prism (light synthesis element) which are hereinafter described are disposed in an optical unit 503 of the projection apparatus 502, and a light flux as image light is obtained by operation of the optical parts. The light flux as image light obtained here is projected by a projection lens 20 and goes out as projection light 600.

Further, in the present embodiment, a bending mirror M for converting a light path is disposed in a light path of a lens system which forms the projection lens 20. Consequently, in the present embodiment, the light flux as image light is bent within the projection lens 20.

In the projection display apparatus 500 having such a structure as described above, the projection light 600 goes out from the projection lens 20 upwardly such that it is illuminated upon the bending mirror 504. Then, the light path of the projection light 600 emitted from the projection lens 20 is bent by the bending mirror 504 so that it is illuminated upon the screen 21.

On the screen 21, an enlarged image obtained from the projected light projected from the projection lens 20 is displayed. For example, an appreciating person looks at the screen 21 from the opposite position to the position at which the projection lens 20 is disposed to appreciate the display image.

The technique of converting the light path in such a manner as indicated by solid lines in FIG. 1 in the projection lens 20 is adopted principally in order to achieve miniaturization of the cabinet 501 of the projection display apparatus 500.

In particular, for example, in the case of FIG. 1, the light path of the light flux as image light obtained in the optical unit 503 of the projection apparatus 502 is converted by 90° to an upward direction in the projection lens 20. Consequently, the optical unit 503 itself of the projection apparatus 502 can be disposed in a substantially horizontally laid state as seen in FIG. 1 (actually, in an inclined state so that the projection light 600 may be illuminated appropriately on the bending mirror 504 as can be seen from (a) of FIG. 1). Further, the optical unit 503 can be disposed such that the front face (side face on which the projection apparatus 502 is mounted)/back face thereof are opposed to a side face of the cabinet 501 of the projection display apparatus 500.

Consequently, when compared with an alternative case wherein, for example, the light path is not converted as with the conventional projection apparatus 502 indicated by broken lines, the space of a portion of the cabinet 501 of the projection display apparatus 500 on the lower side with respect to the screen 21 can be reduced, and therefore, the height H of the cabinet 501 can be reduced. Further, if, in order to reduce the height of the cabinet in the conventional projection apparatus 502, the distance between the projection apparatus 502 and the bending mirror 504 is reduced by moving the projection apparatus 502 upwardly, then the depth D of the cabinet 501 increases because it is necessary to assure the distance between the bending mirror 504 and the screen 21. In contrast, with the projection apparatus 502 in which the light path is converted, the depth D of the cabinet 501 of the projection display apparatus 500 can be reduced.

1-2. General Configuration (Second Example)

Figure 2:
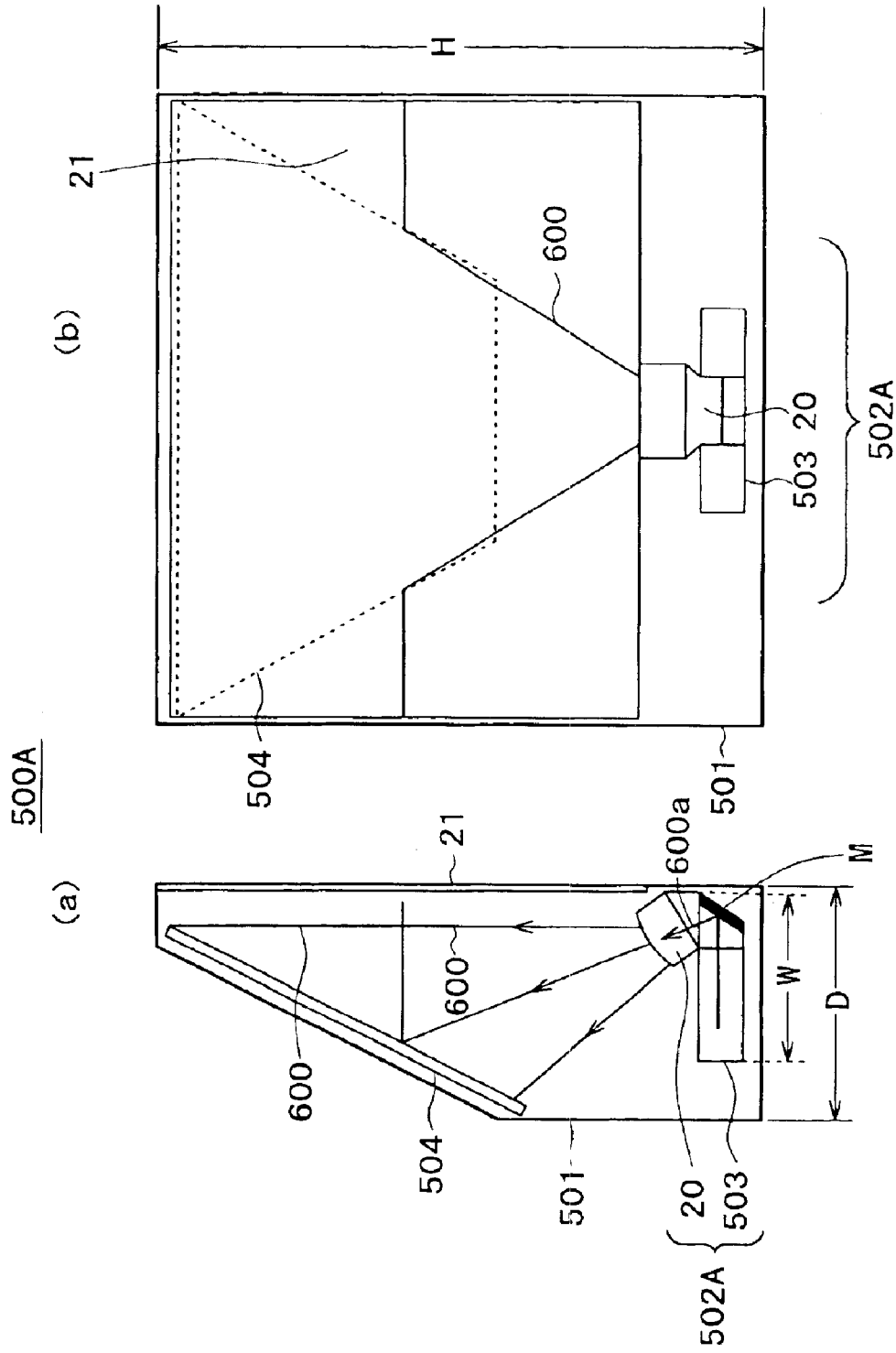
FIG. 2 is a view showing a general configuration (second example) of the projection display apparatus which includes the projection lens according to the embodiment of the present invention.

A second example of the general configuration of a projection display apparatus compatible with the present embodiment is shown in (a) and (b) of FIG. 2. It is to be noted that, in the figures, like elements to those of FIG. 1 are denoted by like reference characters and description of them is omitted.

In the projection display apparatus 500A shown in the figure, a projection apparatus 502A is provided. The projection apparatus 502A converts the light path by more than 90° in the projection lens 20 as can be seen from a route of a light path 600a illustrated in (a) of FIG. 2.

In the configuration shown in FIG. 1, the optical unit 503 of the projection apparatus 502 is disposed in a positional state wherein it is inclined a little (refer to (a) of FIG. 1). However, if the light path is converted by more than 90° in such a manner as in the projection apparatus 502A shown in FIG. 2, then the projection apparatus 502A can be disposed in a fully horizontally laid state as seen also in (a) of FIG. 2.

It is to be noted that the projection display apparatus by which the present invention can be adopted is not limited to the configurations described above with reference to FIGS. 1 and 2, but, for example, the installation form of the projection apparatus in the cabinet of the projection apparatus and so forth may be modified suitably depending upon the conversion direction of the light path in the projection lens of the projection apparatus and so forth.

1-3. Internal Configuration of the Projection Apparatus (First Example)

Subsequently, an internal configuration of the projection apparatus 502 and 502A described hereinabove with reference to FIGS. 1 and 2 is described with reference to FIG. 3.

Figure 3:
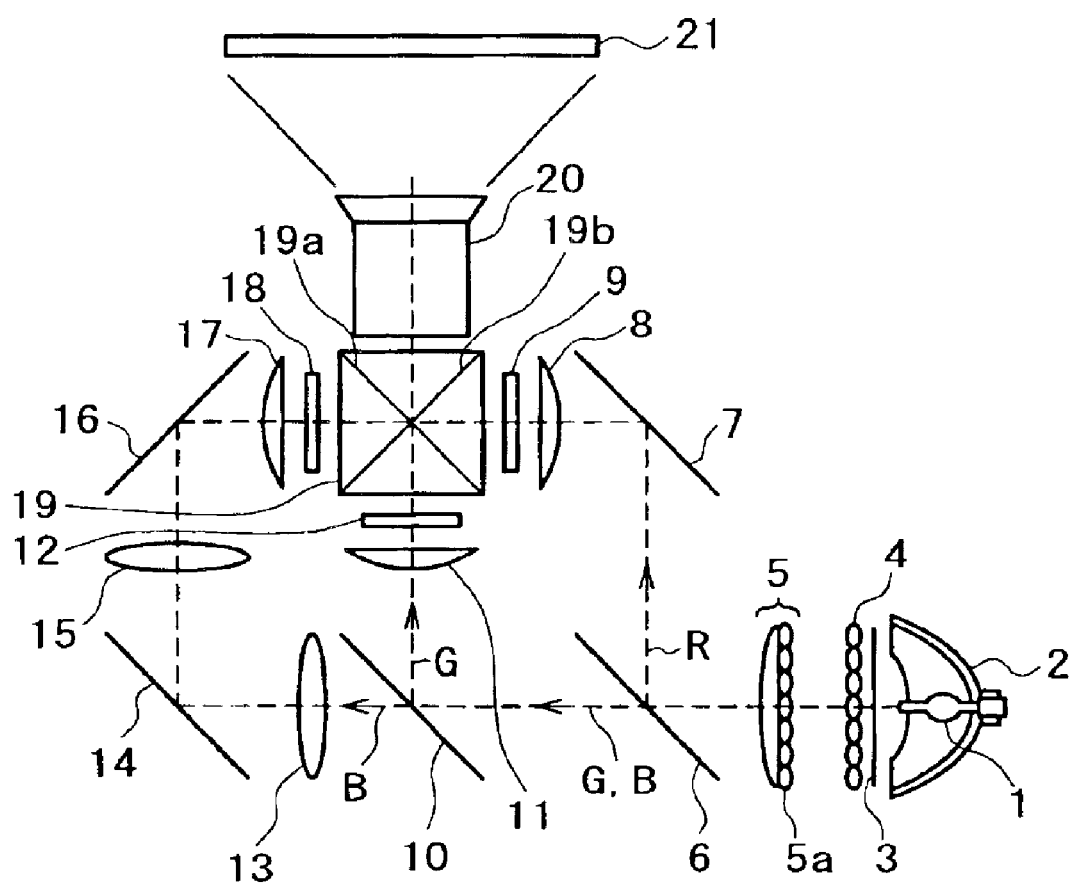
FIG. 3 is a view showing an internal configuration (first example) of the projection display apparatus which includes the projection lens according to the embodiment of the present invention.

FIG. 3 conceptively shows an internal structure of a first example of the projection apparatus 502 or 502A in which the projection lens of the present embodiment can be incorporated. Here, elements other than the screen 21 form the projection apparatus 502 or 502A.

It is to be noted that, according to the projection display apparatus in the present embodiment, the bending mirror 504 is interposed between the projection lens 20 and the screen 21 to convert the light path as shown in FIGS. 1 and 2. Here, however, the bending mirror 504 is not shown in FIG. 3 for the convenience of illustration because description is given principally of the internal configuration of the projection apparatus 502 and 502A.

In the projection apparatus 502 or 502A shown in FIG. 3, a lamp 1 serving as a light source formed from, for example, a metal halide lamp is disposed at a focus position of a reflector 2 (parabolic mirror). Light emitted from the lamp 1 is reflected and collimated by the reflector 2 so that it may become substantially parallel to the optical axis and goes out from an opening of the reflector 2.

Unnecessary light components in an infrared red region and an ultraviolet region from within the light going out from the opening of the reflector 2 are intercepted by an IR-UV cut filter 3, and only light components (color lights) effective for display are introduced to various optical elements disposed in the following stages.

A multi-lens array 4 and another multi-lens array 5 are disposed in the following stage with respect to the IR-UV cut filter 3.

In this instance, the multi-lens array 4 has a flattened configuration wherein a plurality of convex lenses having a shape similar to that of liquid crystal panel blocks serving as optical modulation means which are hereinafter described and having an aspect ratio equal to that of an effective aperture of the liquid crystal panel blocks are disposed in a hounds tooth check pattern with the phases thereof displaced, for example, by ½ from each other.

The multi-lens array 5 has a plano-convex shape and has a plurality of convex lenses 5a formed on a face thereof opposing to the convex lenses of the multi-lens array 4.

The multi-lens array 4 and the multi-lens array 5 are disposed such that a light flux having passed through the IR-UV cut filter 3 is illuminated efficiently and uniformly in the effective apertures of the liquid panel blocks hereinafter described.

Dichroic mirrors 6 and 10 for separating a light flux from the lamp 1 into red, green and blue light components are disposed between the multi-lens array 5 and the effective apertures of the liquid crystal panel blocks.

In the example shown in the figure, a light flux R of red is first reflected by the dichroic mirror 6 while a light flux G of green and a light flux B of blue pass through the dichroic mirror 6. The advancing direction of the light flux R of red reflected by the dichroic mirror 6 is bent by 90° by a mirror 7 so that the light flux R of red is introduced to a condenser lens 8 positioned in front of a liquid crystal display panel 9 for red.

Meanwhile, the light fluxes G and B of green and blue having passed through the dichroic mirror 6 are separated by the dichroic mirror 10. In particular, the light flux G of green is reflected by the dichroic mirror 10 such that the advancing direction thereof is bent by 90° so that the light flux G of green is introduced to a condenser lens 11 positioned in front of a liquid crystal display panel 12 for green. Meanwhile, the light flux B of blue passes through the dichroic mirror 10 and advances straightforwardly, and is then introduced to a condenser lens 17 positioned in front of a liquid crystal display panel 18 for blue through a relay lens 13, a mirror 14, an inverting mirror 15 and another mirror 16.

In this manner, the light fluxes R, G and B of red, green and blue pass through the condenser lenses 8, 11 and 17 and come into the liquid crystal display panels 9, 12 and 18 (which correspond to light valves) for the individual colors, respectively.

Each of the liquid crystal display panels 9, 12 and 18 for the individual colors includes a liquid crystal panel and besides includes an incoming side polarizing plate for arranging the polarization directions of light coming in to the preceding stage to the liquid crystal panel to a fixed direction. Further, in the next stage to each of the liquid crystal panels, an analyzer for allowing passage therethrough only of light having a predetermined polarization plane from within the outgoing light from the liquid crystal panel is disposed such that the intensity of the light is modulated with a voltage of a circuit which drives the liquid crystal elements.

Usually, reflection and transmission characteristics for a P polarization plane are utilized in order to effectively utilize the characteristics of the dichroic mirrors 6 and 10. Accordingly, the incoming side polarizing plate in each of the liquid crystal display panels 9, 12 and 18 is disposed such that it passes light of a polarization plane parallel to the plane of FIG. 3 therethrough.

A liquid crystal panel of, for example, the TN (Twisted Nematic) type is used for the liquid crystal panels which form the liquid crystal display panels 9, 12 and 18 and the operation thereof is formed as of, for example, the normally white type, and the analyzer is disposed such that it passes light polarized perpendicularly to the plane of FIG. 3 therethrough.

The light fluxes of the individual colors optically modulated by the liquid crystal display panels 9, 12 and 18 are introduced to faces shown in the figure of a light synthesis element (cross dichroic prism) 19. The light synthesis element is formed from a combination of prism of a predetermined shape with reflecting films 19a and 19b.

The light flux R of red to the light synthesis element 19 is reflected by the reflecting film 19a and the light flux B of blue is reflected by the reflecting film 19b such that they are introduced into the projection lens 20. Meanwhile, the light flux G of green advances straightforwardly and passes through the inside of the light synthesis element 19 such that it is introduced into the projection lens 20. Consequently, the light fluxes R, G and B are introduced in a state wherein they are synthesized into a single light flux into the projection lens 20.

The projection lens 20 converts the light flux introduced therein from the light synthesis element 19 into projection light and projects the projection light to the screen 21, for example, of the transmission type.

1-4. Internal Configuration of the Projection Apparatus (Second Example)

FIG. 4 conceptually shows an internal configuration as a second example of the projection apparatus 502, 502A which can incorporate the projection lens 20 of the present embodiment. It is to be noted that, in the figure, like elements to those of FIG. 3 are denoted by like reference characters and overlapping description thereof is omitted.

In this instance, the light flux B is reflected by a dichroic mirror 6A in the next stage to the multi-lens array 5 while the light fluxes R and G pass through the dichroic mirror 6A.

The light flux B reflected by the dichroic mirror 6A is reflected by a mirror 7A and further passes through a condenser lens 8A, and then it is optically modulated by a liquid crystal panel block 9A for blue and thereafter goes in a direction shown in the figure into a light synthesis element 19A.

The light flux R and the light flux G having passed through the dichroic mirror 6A are introduced into another dichroic mirror 10A in the following stage. In this instance, the dichroic mirror 10A reflects the light flux R but passes the light flux G therethrough.

The light flux R reflected by the dichroic mirror 10A passes through a condenser lens 11A and is optically modulated by a liquid crystal panel block 12A for red, whereafter it comes in a direction indicated in the figure into the light synthesis element 19A.

The light flux G having passed through the dichroic mirror 10A successively passes a relay lens 13A, a mirror 14A, an inverting relay lens 15A and another mirror 16A, and comes to a condenser lens 17A. Then, the light flux G passes through the condenser lens 17A and is optically modulated by a liquid crystal panel block 18A for green, whereafter it comes in a direction indicated in the figure into the light synthesis element 19A.

Also the light synthesis element 19A is formed from a combination of a prism of a predetermined shape with reflecting films 19A-a and 19A-b.

The light flux B of the light fluxes of the different colors coming in the light synthesis element 19A is reflected by the reflecting film 19A-b and introduced into the projection lens 20 while the light flux G is reflected by the reflecting film 19A-a and introduced into the projection lens 20.

Meanwhile, the light flux R advances straightforwardly and passes through the light synthesis element 19A and comes into the projection lens 20. As a result, the light fluxes R, G and B are synthesized into a single light flux and introduced as such into the projection lens 20.

1-5. Internal Configuration of the Projection Apparatus (Third Example)

Figure 5:
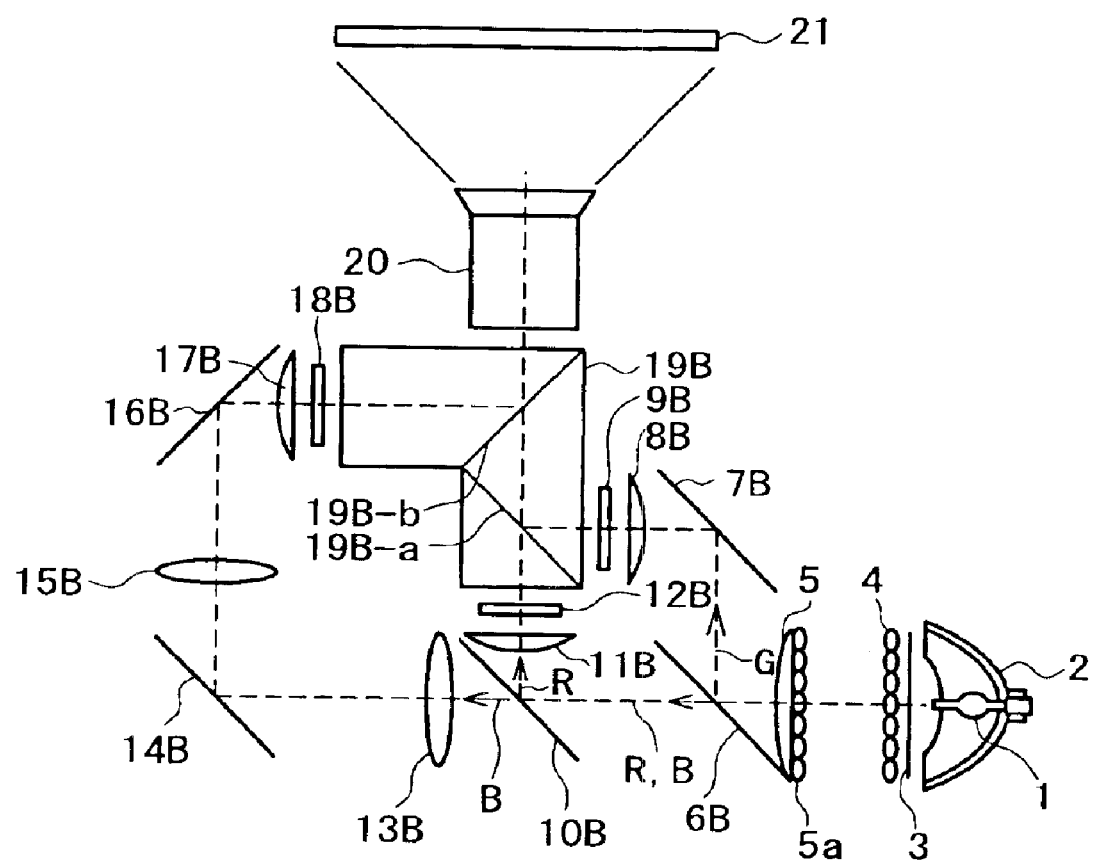
FIG. 5 is a view showing an internal configuration (third example) of the projection display apparatus which includes the projection lens according to the embodiment of the present invention.

FIG. 5 conceptually shows an internal configuration as a third example of the projection apparatus which can incorporate the projection lens of the present embodiment. It is to be noted that, in the figure, like elements to those of FIGS. 3 and 4 are denoted by like reference characters and overlapping description of them is omitted.

In this instance, the light flux G is reflected by a dichroic mirror 6B while the light flux R and the light flux B pass through the dichroic mirror 6B.

The light flux G reflected by the dichroic mirror 6B successively passes through a mirror 7B, a condenser lens 8B and a liquid crystal panel block 9B for green and comes in a direction indicated in the figure into a light synthesis element 19B.

The light flux R and the light flux B having passed through the dichroic mirror 6B are introduced to a dichroic mirror 10B, and thereupon, the light flux R is reflected by the dichroic mirror 10B while the light flux B passes through the dichroic mirror 10B.

The light flux R reflected by the dichroic mirror 10B successively passes through a condenser lens 11B and a liquid crystal panel block 12B for red and comes in a direction indicated in the figure into the light synthesis element 19B.

The light flux B having passed through the dichroic mirror 10B successively passes a relay lens 13B, a mirror 14B, an inverting relay lens 15B, another mirror 16B, a condenser lens 17B and a liquid crystal panel block 18B for blue and comes in a direction indicated in the figure into the light synthesis element 19B.

Also the light synthesis element 19B is formed from a combination of a prism of a predetermined shape with reflecting films 19B-a and 19B-b. Here, the light flux G of the light fluxes of the different colors introduced into the light synthesis element 19B is reflected by the reflecting film 19B-a and the light flux B is reflected by the reflecting film 19B-b while the light flux R advances straightforwardly and passes through light synthesis element 19B so that they form a single light flux and come into the projection lens 20.

For the light valve units of the transmission type (liquid crystal panel blocks) provided in the structures described hereinabove in connection with the first to third examples, for example, an STN (Super Twisted Nematic) liquid crystal display element, a ferroelectric liquid crystal display element, or a macromolecular dispersion type liquid crystal display element can be adopted. Further, as a driving method, simple matrix driving or active matrix driving can be used.

While the projection apparatus as the present embodiment is described by way of the three examples above, they are mere examples at all, and various other internal configurations may be applied to the projection display apparatus in which the projection lens of the present embodiment can be incorporated.

2. Lens

For the projection lens 20 of the present embodiment described below, a lens system of the retrofocus type is adopted. Here, the principle of the retrofocus lens is described briefly with reference to FIGS. 6A to 6D and 7A to 7B.

Figure 6:
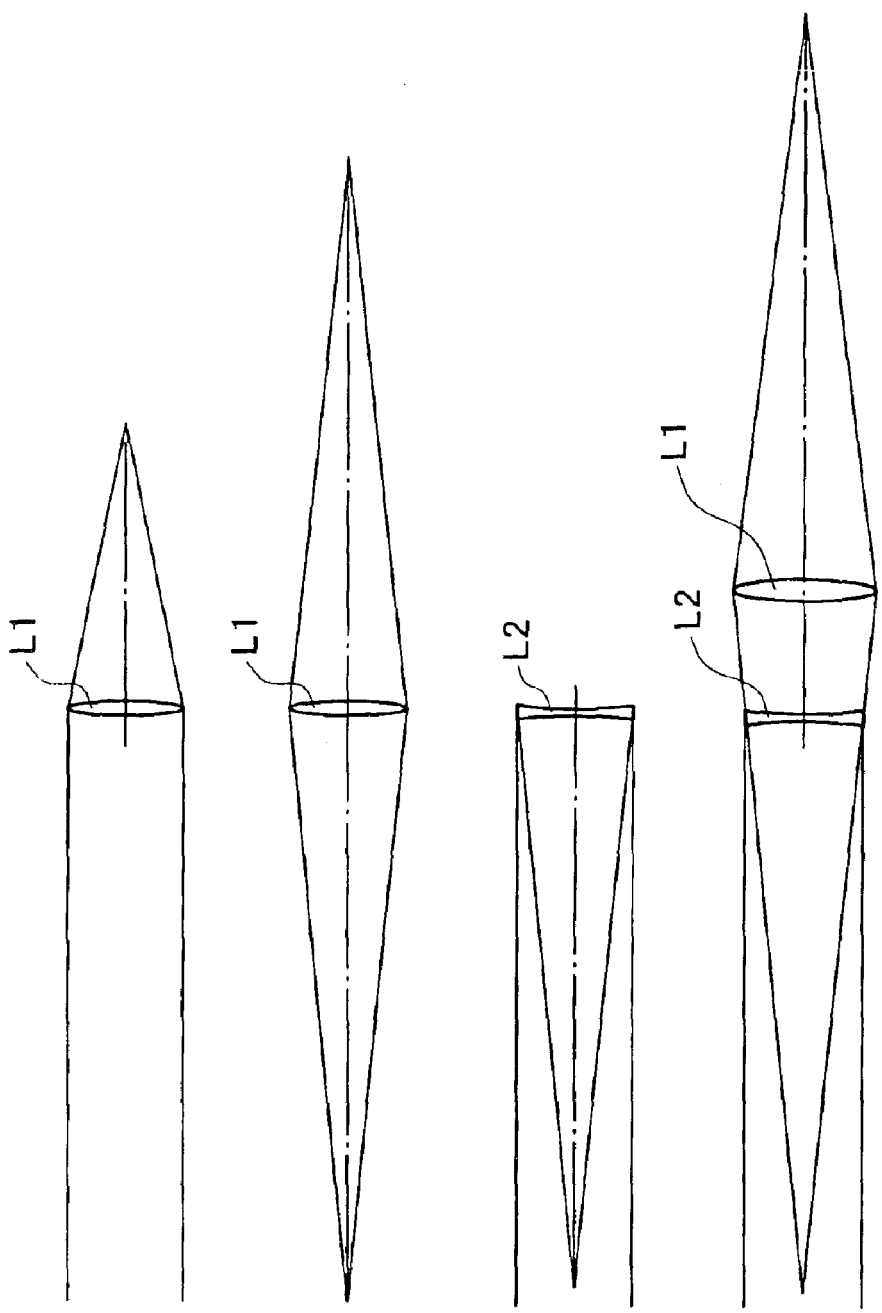
FIGS. 6A to 6D are diagrammatic views illustrating a principle of a retrofocus lens.

A lens L1 shown in FIG. 6A has a positive refractive power. FIG. 6A indicates that, where an object is at a point at infinity, the focal position of an ordinary lens having a positive refractive power is at a position of a focal distance on the small conjugate side from the center of the lens L1, that is, the principal point.

In contrast, where the object point is positioned nearby, the distance to the focal position becomes long as seen in FIG. 6B.

Meanwhile, a lens L2 shown in FIG. 6C has a negative refractive power. FIG. 6C indicates that, where an object is at a point at infinity, the focal position of a lens having a negative refractive power is at a position of a focal distance on the large conjugate side from the principal point.

Therefore, a lens system of the retrofocus type can be formed by combining a lens having positive refractive power having the characteristic described above with another lens having a negative refractive power having the characteristic described above in such a manner as seen in FIG. 6D.

In such a lens system of the retrofocus type as just described, an image is formed once at a short distance on the large conjugate side by the lens L2 (which may be considered as a lens set) on the front side having a negative refractive power, and the image becomes the object point to the lens L1 (which may be considered as a lens set) on the rear side having a positive refractive power. Therefore, the lens system of the retrofocus type has a long back focus between the principal point and the focus.

Thus, in the present embodiment, a first lens set 0 which corresponds to the lens L2 on the front side having a negative refractive power is configured such that a great distance is assured and a well-balanced refractive power distribution is assured between a first A lens set 100 having a negative refractive power and a first B lens set 200 having a positive refractive power so as to obtain a sufficiently great space to allow conversion of a light path within the projection lens 20 as hereinafter described.

Here, a relationship between the iris position of the lens system of the retrofocus type and the telecentric performance of a principal ray of light is described with reference to FIGS. 7A to 7B.

Where an object is positioned at a point at infinity, parallel rays of light come into the lens and are condensed at the focus by the lens. On the contrary where the object point is at the focus position, parallel rays of light are emitted from the lens.

Figure 7:
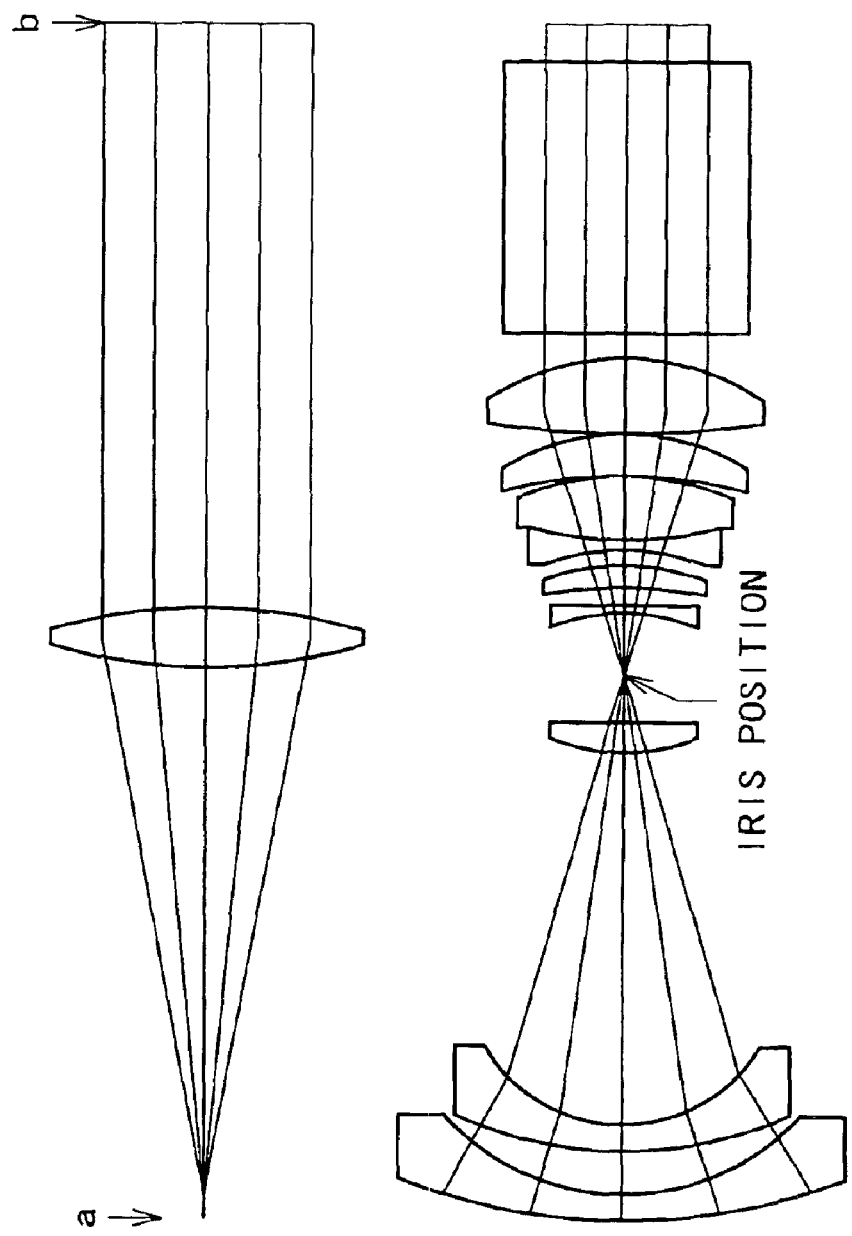
FIGS. 7A and 7B are diagrammatic views illustrating a relationship between the iris position and the telecentric property of a principal ray of light.

Here, it is assumed that a principal ray of light is a ray of light which passes the center of an iris as seen in FIG. 7B. If the iris position is set to the front side focus position of the lens group positioned on the rear side of the iris under the condition just described, then the outgoing rays of light become parallel rays of light. This is called telecentric property of a principal ray of light.

3. Configuration of the Projection Lens 3-1. Arrangement Structure of the Lenses Subsequently, an arrangement structure of the lenses in the projection lens as the present embodiment is described with reference to FIGS. 8 to 12 and 13. Projection lenses as first to fifth embodiments described below are adopted as the projection lens 20 in the projection display apparatus described above with reference to FIGS. 3 to 5.

It is to be noted that the description here is directed principally to the arrangement structures of lenses as the first to fifth embodiments and the shape of each lens, the distance between lenses and so forth are presented in numerical value embodiments hereinafter described.

Further, reference characters r1 to r22 (r20) appearing in FIGS. 8 to 12 hereinafter described denote lens surface numbers, and reference characters d1 to d21 (d19) denote lens surface distances and lens distances (lens thicknesses) along an axis of a principal ray of light.

Further, while the present embodiment adopts a configuration wherein the light path is converted in the inside of the projection lens 20 by the bending mirror M, in FIGS. 8 to 12, the light path is indicated as a straight light path for the convenience of clear indication of the positional relationship of lenses in the projection lens 20. Therefore, the bending mirror M is shown only as an arrangement order position in the linear light path.

Further, the projection lens of the present embodiment adopts a structure wherein, in each of a front side lens set (front set: first lens set) and a rear side lens set (rear set: second lens set) in the lens system, an aspheric lens having a required aspheric shape is disposed. Here, a condition where an aspheric lens is used as the lens is described briefly.

Where an aspheric lens is used as a negative lens of the front set, it is shaped so that the negative power (negative refractive power) decreases away from the optical axis.

On the other hand, where an aspheric lens is used as a positive lens of the rear set, it is shaped so that the positive power (positive refractive power) decreases away from the optical axis. In contrast, where an aspheric lens is used as a negative lens of the rear set, it is shaped so that the negative power (negative refractive power) decreases away from the optical axis.

Figure 8:
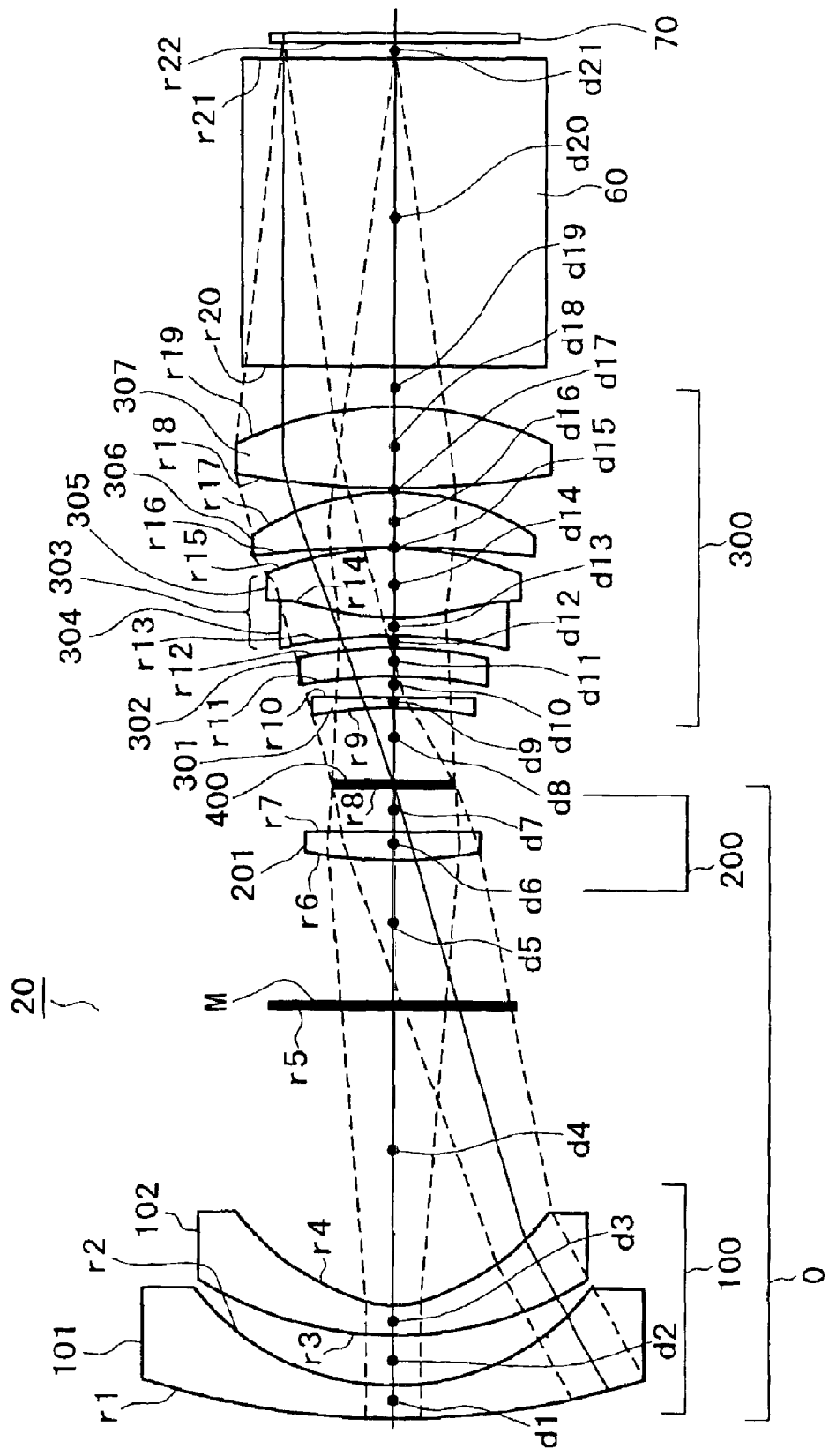
FIG. 8 is a sectional view showing an example of a structure of a projection lens as a first embodiment.

In this instance, the aspheric surface portion of the aspheric lens preferably has a height of an off-axis light flux from the optical axis as great as possible, for example, like a lens 102 of FIG. 8. This decreases the overlap amount of light fluxes of different image heights and is effective in correction of off-axis aberrations such as an astigmatism and a distortion aberration. Further, if an aspheric surface portion is used for an on-axis and off-axis overlapping surface, for example, for a lens 302 of FIG. 8, then there is an effect in correction of a spherical aberration or a comatic aberration.

First, an arrangement structure of lenses of the projection lens 20 as the first embodiment is described.

FIG. 8 is a sectional view conceptively showing an arrangement structure of lenses of the projection lens 20 as the first embodiment. In the figures, the left side is referred to as "screen side" on which the screen 21 is present while the right side is referred to as "panel side" on which a light valve apparatus and the light synthesis element are present. Further, a light synthesis element 60 conceptively indicates, for example, the light synthesis elements (19, 19A, 19B) shown in FIGS. 3 to 5, and a light valve block 70 conceptively indicates the light valve apparatus (liquid crystal display panel block for the color of R, G or B) shown in FIGS. 3 to 5.

The projection lens 20 of the first embodiment includes a first lens set 0, an iris 400 and a second lens set 300 arrayed in order from the screen side to the panel side as seen in FIG. 8.

In this instance, the first lens set 0 includes a first A lens set 100 and a first B lens set 200 arranged in order from the screen side to the panel side and has a negative refractive power as a whole. Further, the first lens set 0 includes a bending mirror M as light path conversion means interposed between the first A lens set 100 and the first B lens set 200. Consequently, actually the light path is converted within the first lens set 0 by reflection by the bending mirror M.

The first A lens set 100 in the instance includes a meniscus lens 101 and an aspheric lens 102 disposed in order from the screen side to the panel side.

Here, the meniscus lens 101 positioned nearest to the screen side and having opposite surfaces formed as aspheric surfaces has a negative refractive power and has a convex shape to the screen side. The meniscus lens 102 also has a negative refractive power and a general configuration as a meniscus lens having a convex shape to the screen side. Further, a lens surface (r4) of the aspheric lens 102 on the panel side is an aspheric surface formed in accordance with an aspheric coefficient in the numerical value embodiments hereinafter described. The first A lens set 100 has a negative refractive power as a whole.

Meanwhile, the first B lens set 200 includes a single positive lens 201 disposed therein and accordingly has a positive refractive power as a whole.

The second lens set 300 includes a meniscus lens 301, an aspheric lens 302, a laminated lens 303, a positive lens 306 and another positive lens 307 disposed in order from the screen side to the panel side.

The laminated lens 303 includes a concavo-concave lens 304 and a positive lens 305 disposed in order from the screen side to the panel side and laminated to each other. Further, a lens surface (r12) of the aspheric lens 302 on the panel side has an aspheric surface formed in accordance with an aspheric coefficient in the numerical value embodiments hereinafter described. Further, from among the second lens set, at least the positive lens 307, positive lens 306 and laminated lens 303 disposed in order from the light valve 70 side (the panel side) are glass lenses.

The second lens set 300 having such a configuration as described above has a positive refractive power as a whole.

Figure 9:
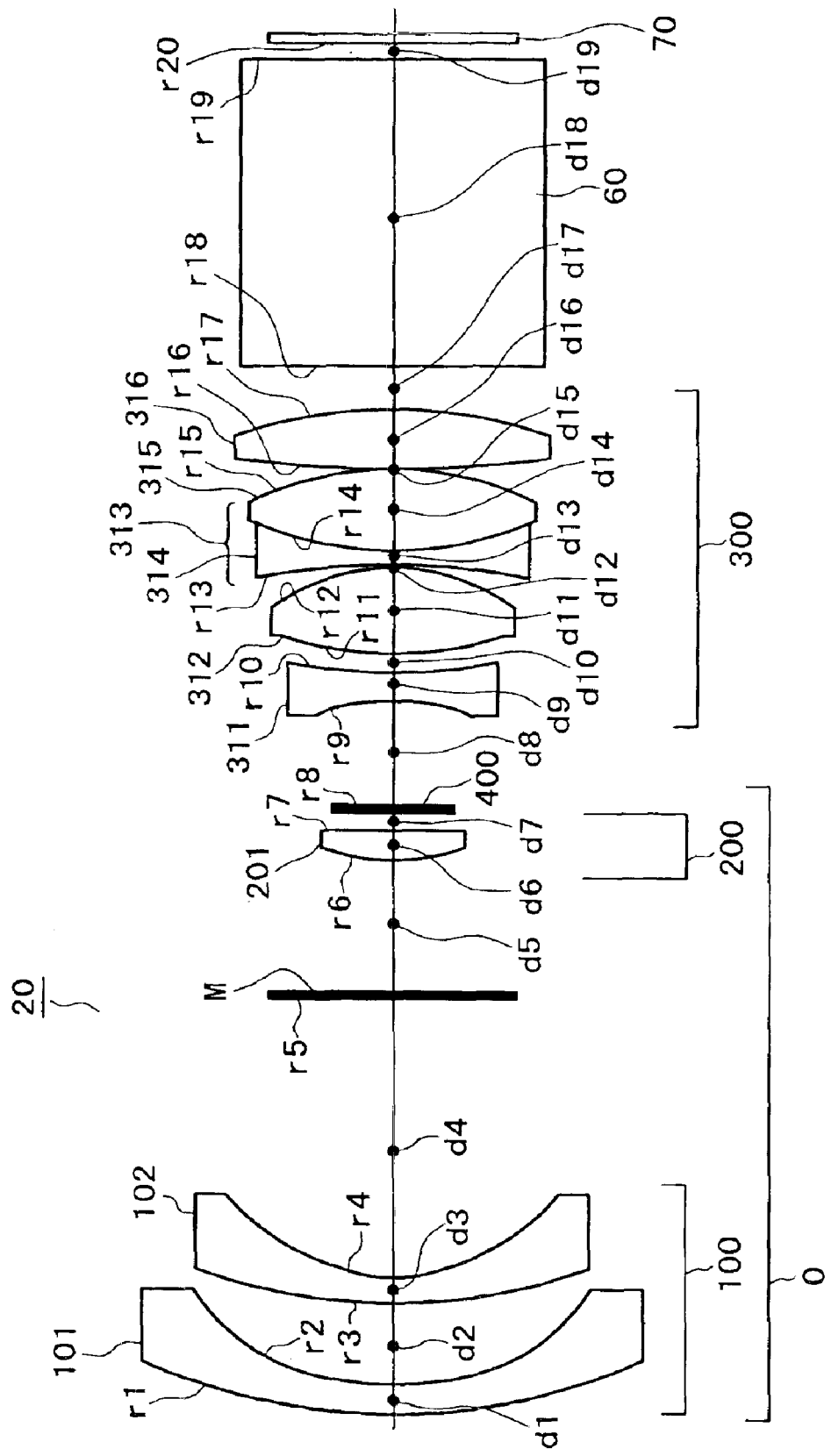
FIG. 9 is a sectional view showing an example of a structure of a projection lens as a second embodiment.

The sectional view of FIG. 9 shows a lens arrangement structure of the projection lens 20 as the second embodiment, and like elements to those of FIG. 8 are denoted by like reference characters and overlapping description of them is omitted.

In the projection lens 20 shown in the figure, as a lens arrangement structure of the second lens set 300, an aspheric lens 311, a positive lens 312, a laminated lens 313 and another positive lens 316 are disposed in order from the screen side to the panel side.

The aspheric lens 311 has aspheric surfaces at a lens surface (r9) thereof on the screen side and a lens surface (r10) thereof on the panel side.

Of the lenses in the second lens set, at least the positive lens 316, laminated lens 313 and positive lens 312 disposed from the light valve block 70 side (panel side) are glass lenses.

Further, the laminated lens 313 in this instance includes a concavo-concave lens 314 and a positive lens 315 disposed in order from the screen side to the panel side and laminated to each other.

Figure 10:
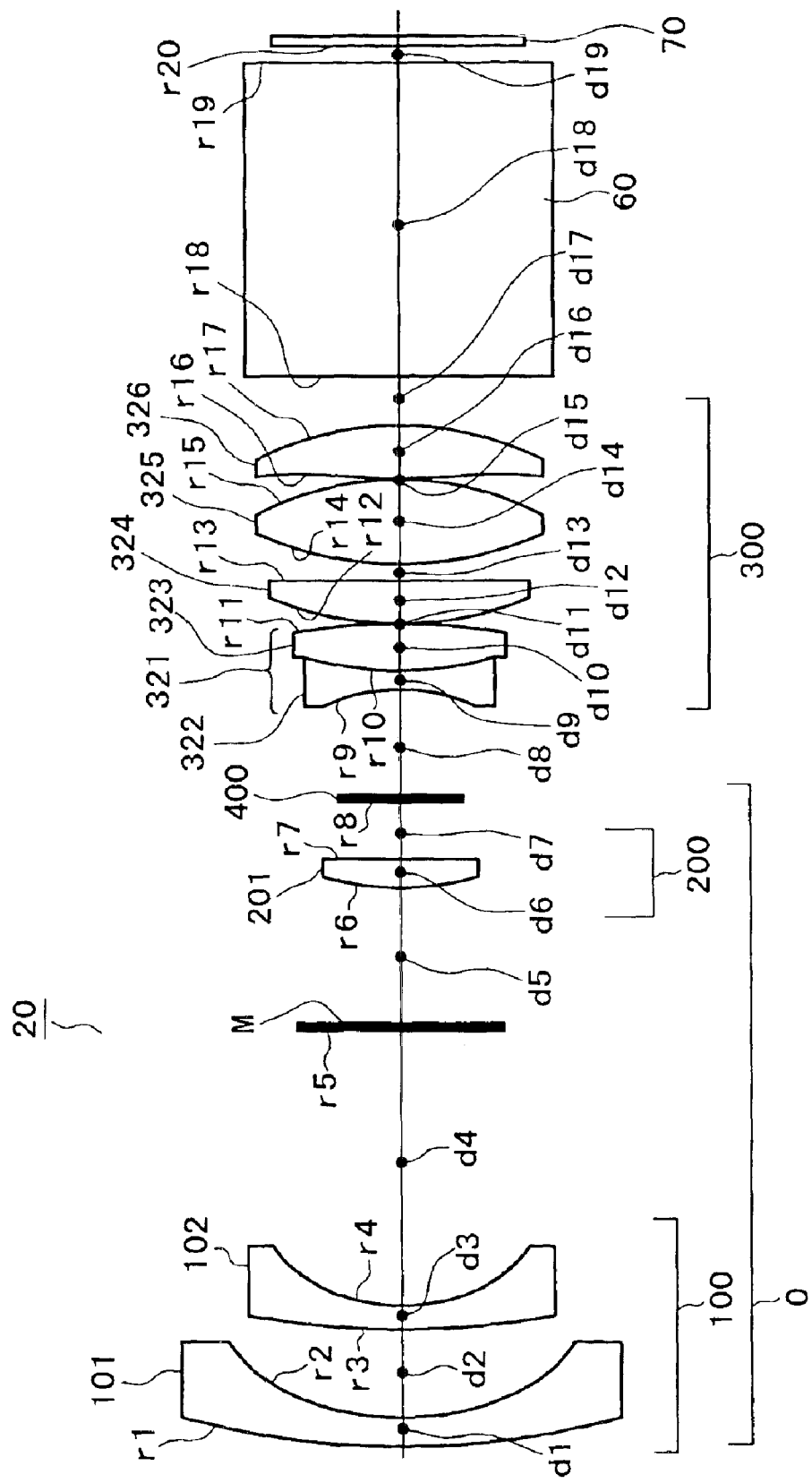
FIG. 10 is a sectional view showing an example of a structure of a projection lens as a third embodiment.
Figure 11:
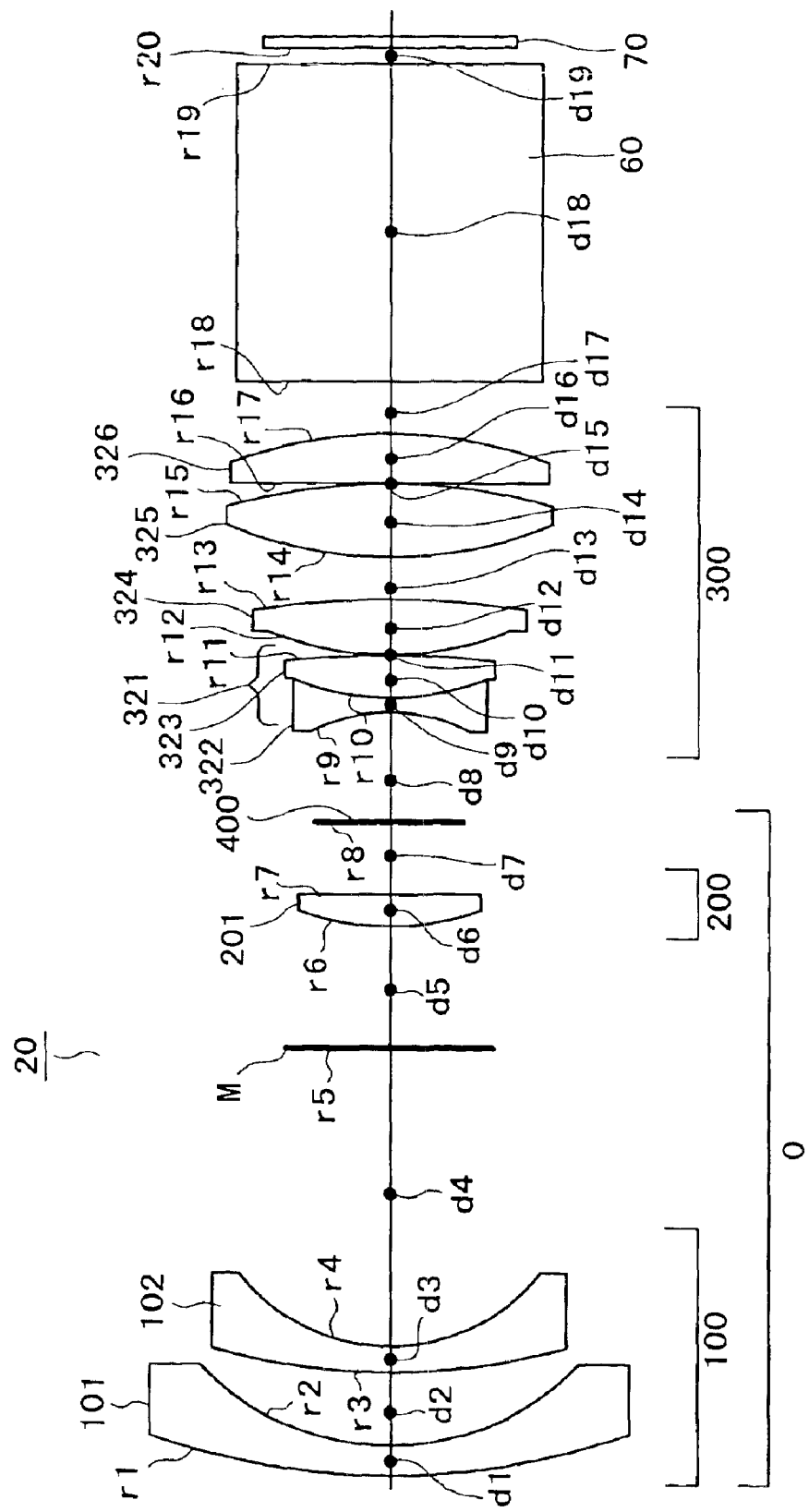
FIG. 11 is a sectional view showing an example of a structure of a projection lens as a fourth embodiment.

The sectional views shown in FIGS. 10 and 11 show lens arrangement structures of the projection lens 20 as third and fourth embodiments, respectively, and like elements to those of FIGS. 8 and 9 are denoted by like reference characters and overlapping description of them is omitted.

The second lens set 300 of the projection lens 20 shown in the figure includes a laminated lens 321, a positive lens 324, another positive lens 325 and an aspheric lens 326 disposed in order from the screen side to the panel side. In short, in this instance, the aspheric lens to be disposed in the second lens set 300 is positioned nearest to the panel side. Further, the aspheric lens 326 in this instance has aspheric surfaces at the opposite surfaces (r16, r17) thereof.

A central air distance d13 between the positive lenses 324 and 325 is the longest central air distance in the second lens set 300.

Of the lenses in the second lens set, at least the laminated lens 321, positive lens 324 and positive lens 325 disposed from the screen side are glass lenses.

The positive lens 325 has the highest refractive power in the second lens set.

The laminated lens 321 includes a concavo-concave lens 322 and a positive lens 323 disposed in order from the screen side to the panel side and laminated with each other.

Figure 12:
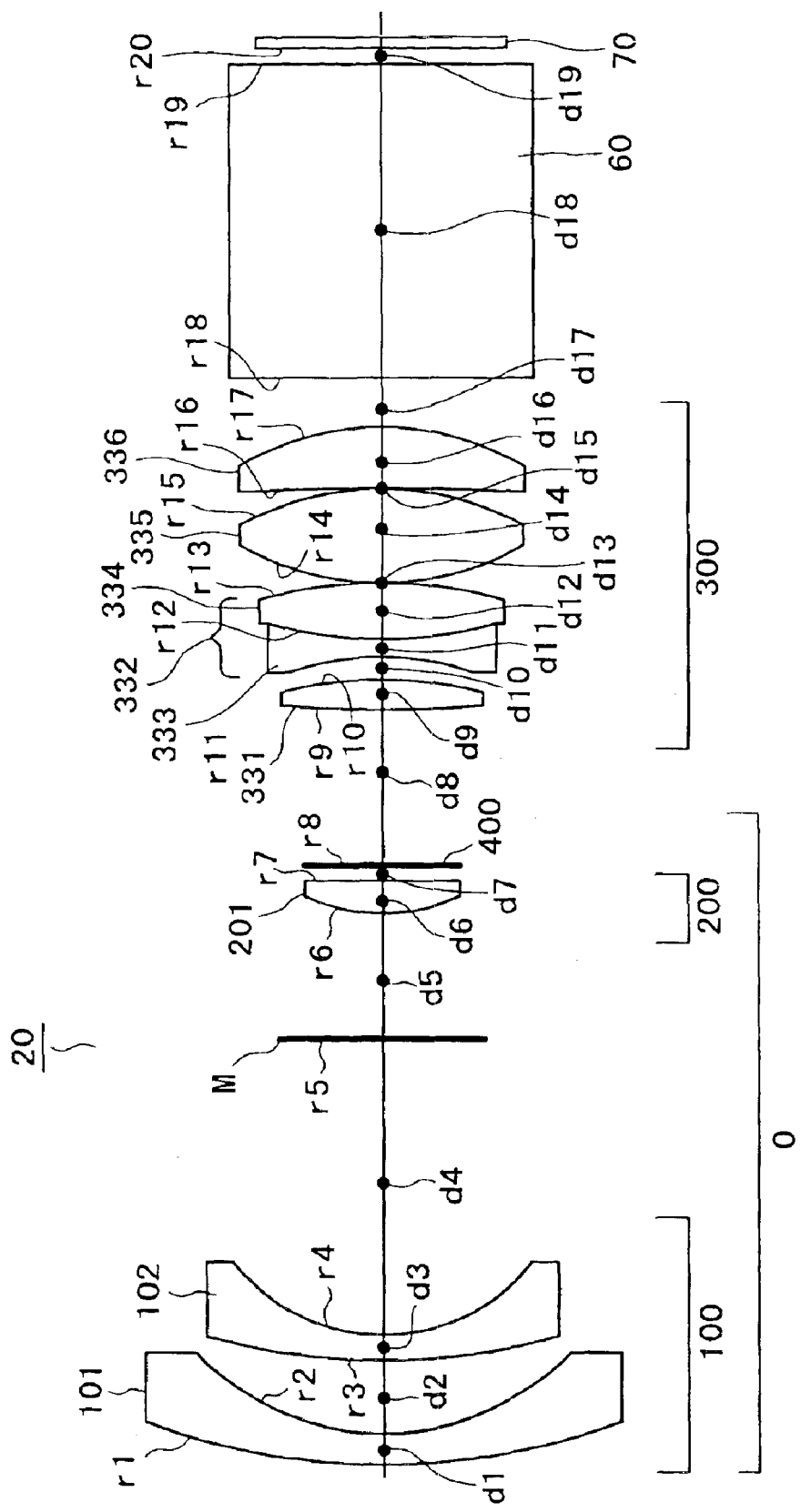
FIG. 12 is a sectional view showing an example of a structure of a projection lens as a fifth embodiment.

The sectional view of FIG. 12 shows a lens arrangement structure of the projection lens 20 as a fifth embodiment. In the figure, like elements to those of FIGS. 8 to 11 are denoted by like reference characters and overlapping description of them is omitted.

In the projection lens 20 of the fifth embodiment shown in FIG. 12, as a lens arrangement structure of the second lens set 300, a positive lens 331, a laminated lens 332, another positive lens 335 and an aspheric lens 336 are disposed in order from the screen side to the panel side.

Of the lenses of the second lens set, at least the positive lens 331, laminated lens 332 and positive lens 335 are glass lenses.

Also the laminated lens 332 in this instance includes a concavo-concave lens 333 and a positive lens 334 disposed in order from the screen side to the panel side and laminated with each other. The aspheric lens 336 has aspheric surfaces at the opposite surfaces (r16, r17) thereof.

Further, though not shown in FIGS. 8 to 12, in the present embodiment, the positive lens 201 of the first B lens set may be replaced by a laminated lens formed from a positive lens and a negative lens and serving as an achromatic lens.

Where such a structure as just described is used, occurrence of various aberrations beginning with a chromatic aberration in the first lens set 0 is suppressed, and the degree of aberration correction by the second lens set 300 in the following stage can be reduced.

Figure 13:
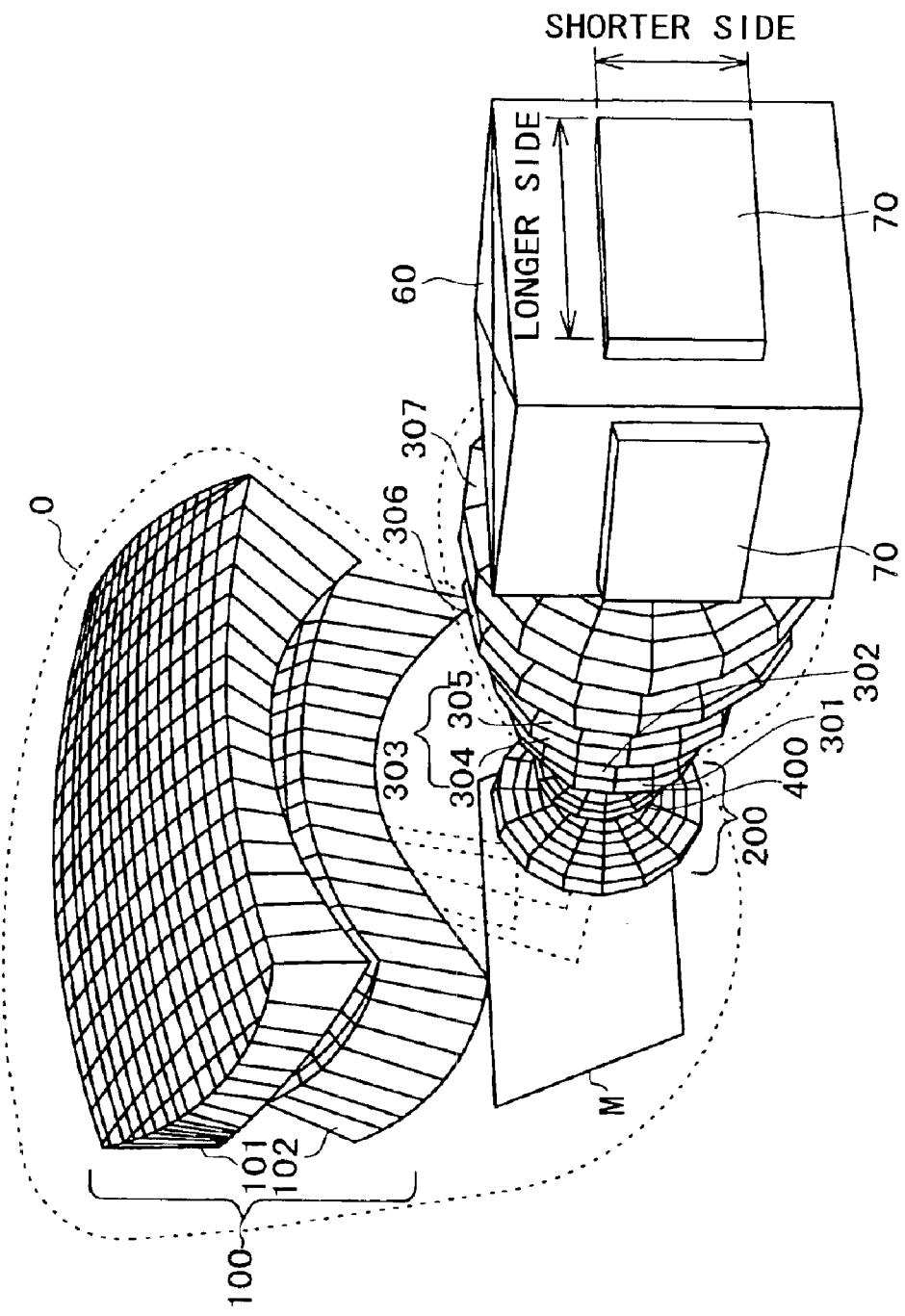
FIG. 13 is a three-dimensional view three-dimensionally showing an example of a structure of the projection lens of the present embodiment (first embodiment) where conversion of a light path is performed along a shorter side of a light valve block.
Figure 14:
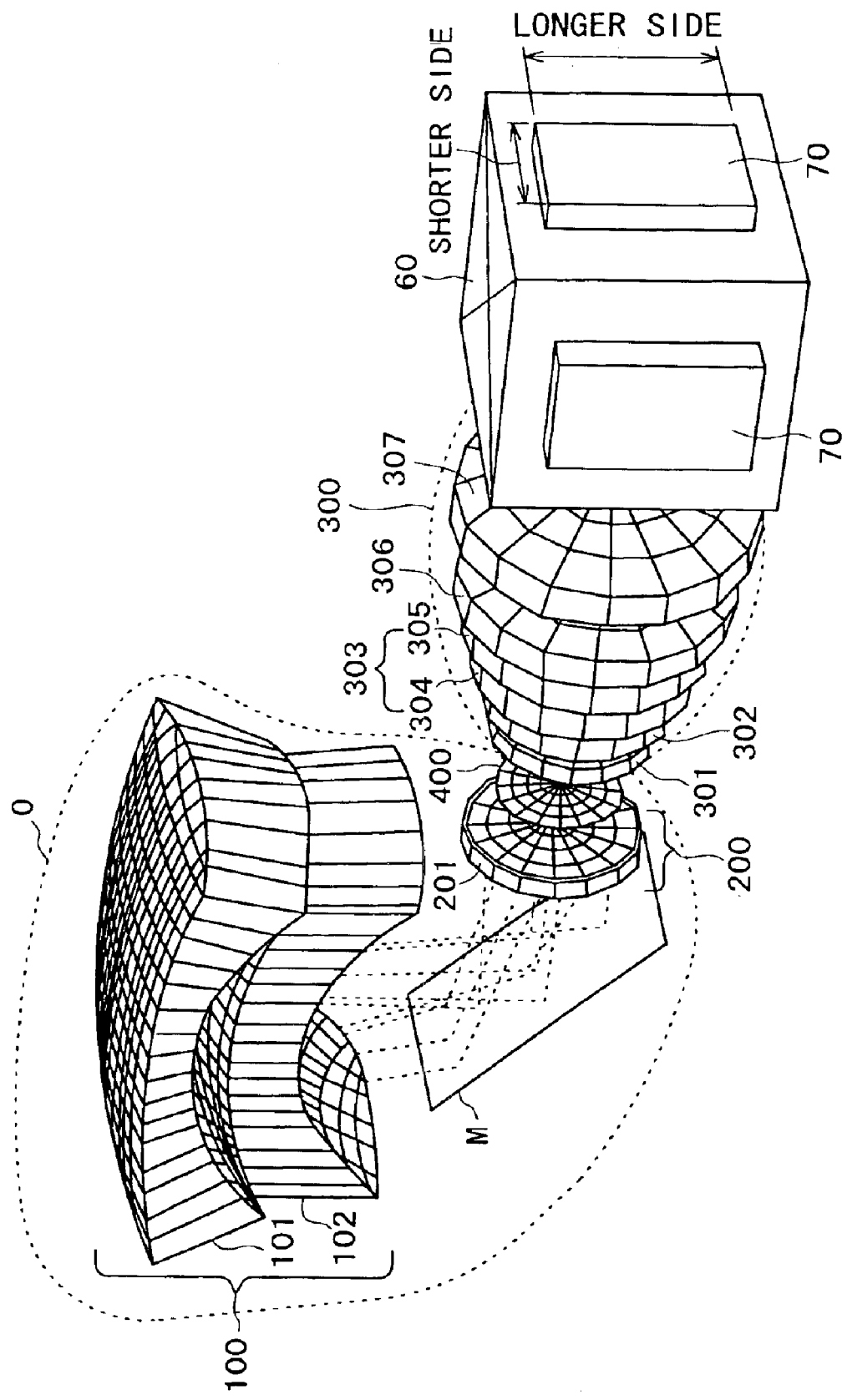
FIG. 14 is a three-dimensional view three-dimensionally showing an example of a structure of the projection lens of the present embodiment (first embodiment) where conversion of a light path is performed along a longer side of a light valve block.
Figure 21:
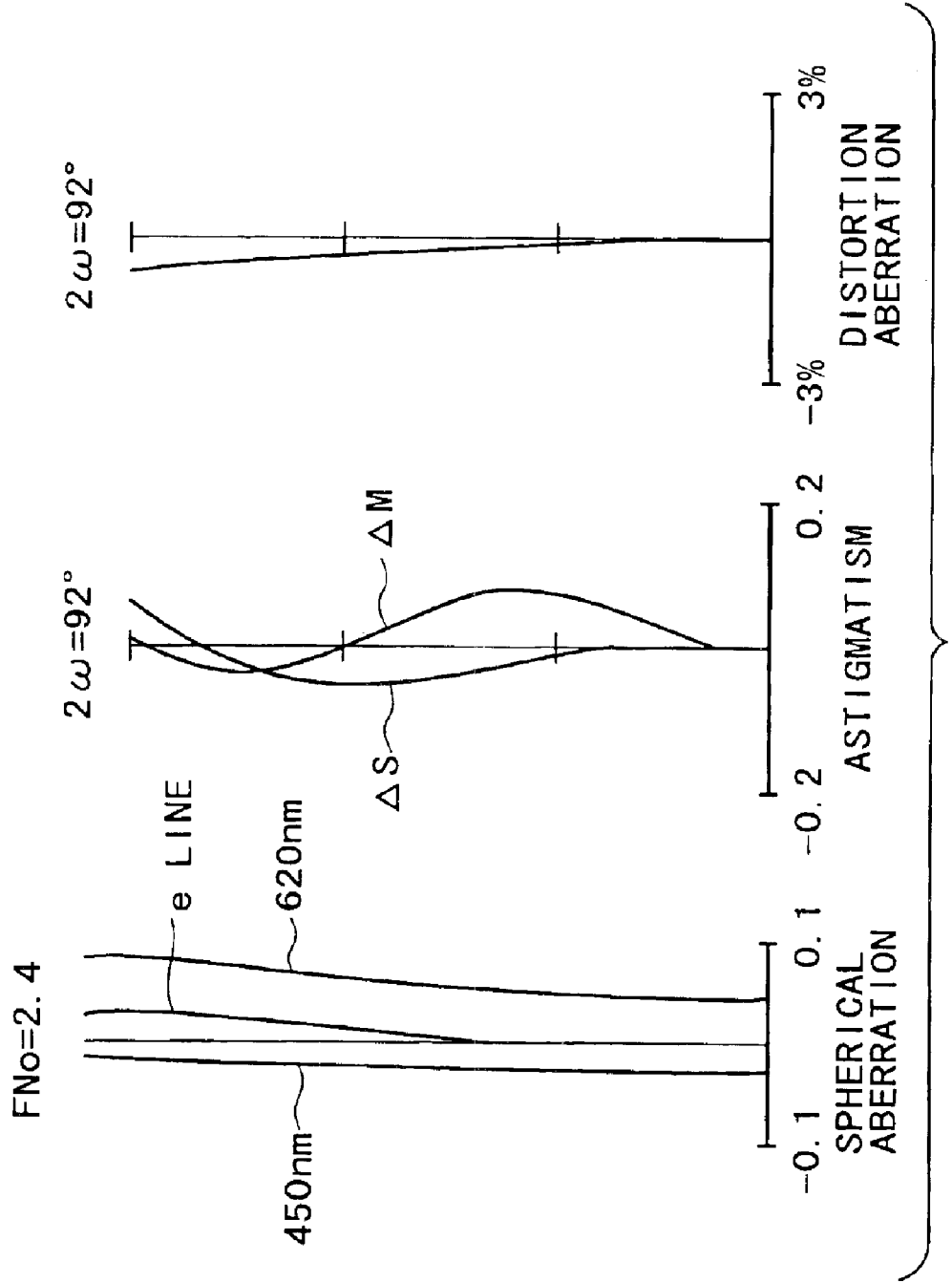
FIG. 21 is a view illustrating a spherical aberration, an astigmatism and a distortion aberration of the projection lens as the first embodiment.
Figure 22:
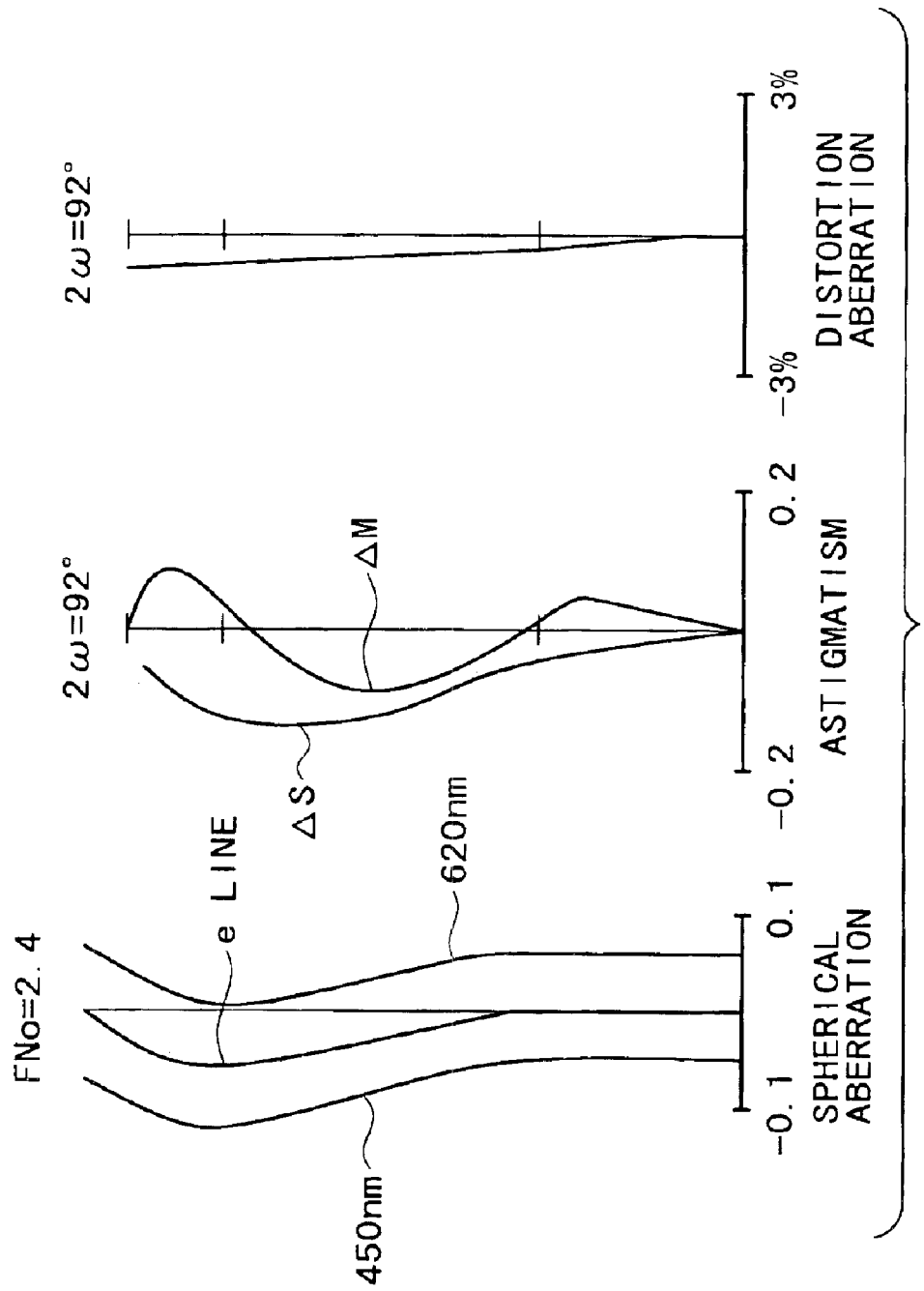
FIG. 22 is a view illustrating a spherical aberration, an astigmatism and a distortion aberration of the projection lens as the second embodiment.
Figure 23:
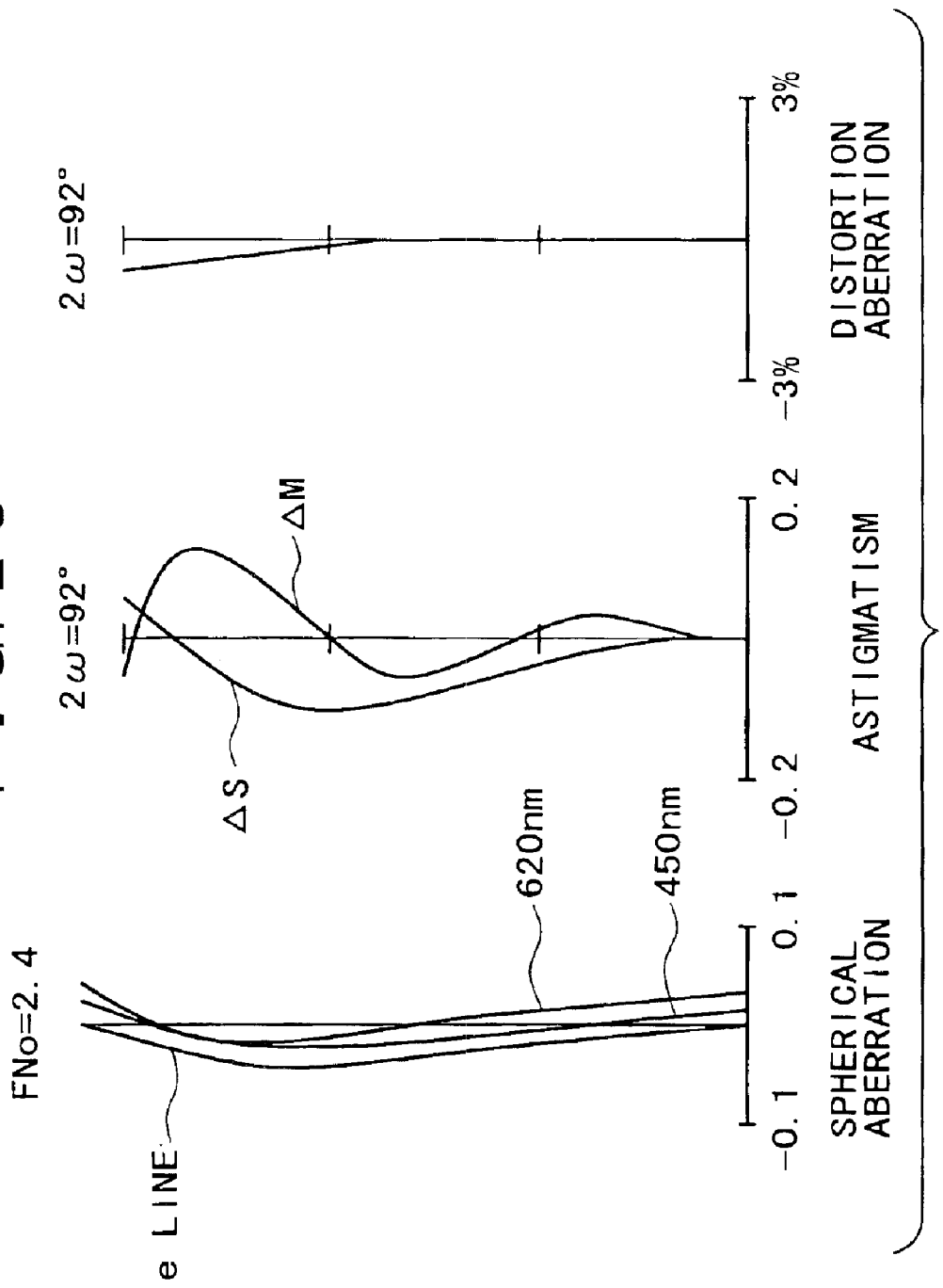
FIG. 23 is a view illustrating a spherical aberration, an astigmatism and a distortion aberration of the projection lens as the third embodiment.
Figure 24:
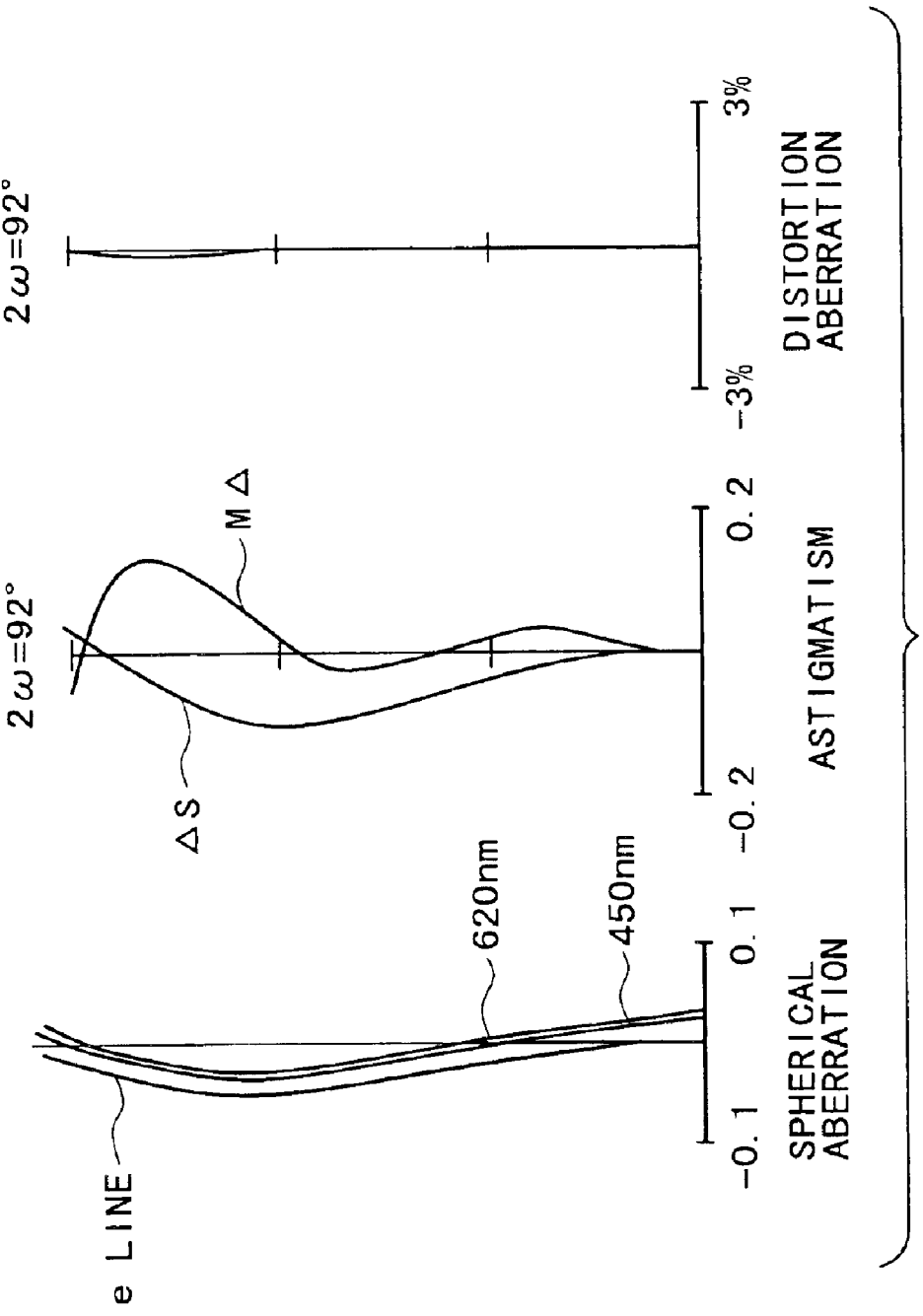
FIG. 24 is a view illustrating a spherical aberration, an astigmatism and a distortion aberration of the projection lens as the fourth embodiment.
Figure 25:
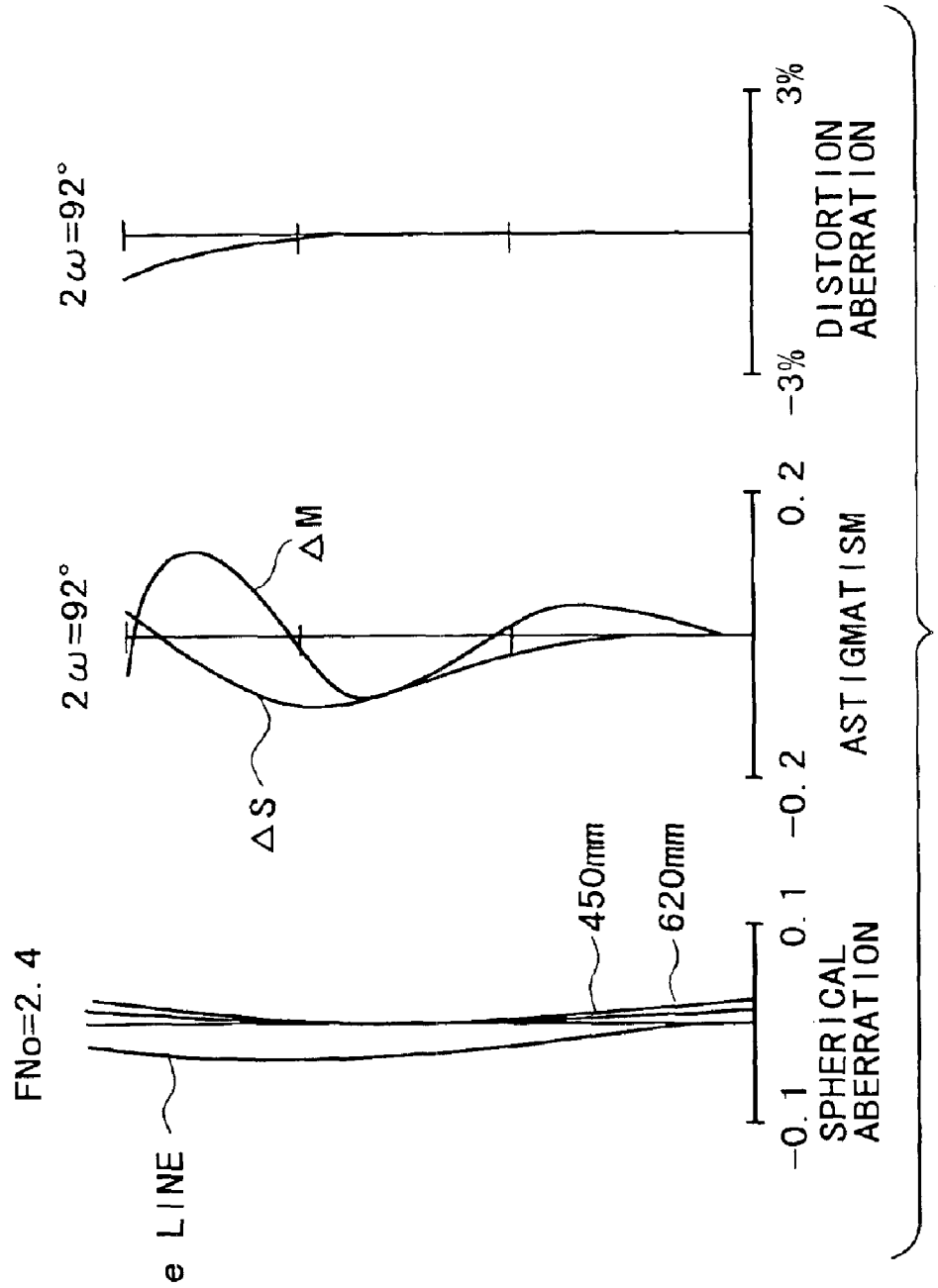
FIG. 25 is a view illustrating a spherical aberration, an astigmatism and a distortion aberration of the projection lens as the fifth embodiment.

In the projection lenses 20 of the embodiments described hereinabove, the light path can be converted by a predetermined angle by provision of the bending mirror M, and examples of a three-dimensional positional relationship of the lens sets in the projection lens 20 are shown in FIGS. 13 and 14. It is to be noted that, in the figures, a projection lens having the lens structure according to the first embodiment shown in FIG. 8 is shown.

In FIGS. 13 and 14, a light valve block 70 and a light synthesis element 60 which synthesizes different color lights incoming from the light valve block 70 into white light and emits the white light to the projection lens side are shown first.

For example, light incoming from the light synthesis element 60 to the nearest side of the second lens set 300 to the panel side (panel side) successively passes through the plural lenses (307→306→303 (305→304)→302→301) which compose the second lens set 300 and further through the iris 400 and first B lens set (positive lens 201) and comes to the bending mirror M. Then, in this instance, the light path is converted upwardly by a predetermined angle so that the light is introduced into the first A lens set 100 (102→101).

Further, according to the configurations of the projection lens 20 shown in FIGS. 13 and 14, the lenses (101, 102) which form the first A lens set have an outside shape wherein they are cut at portions thereof outside an effective ray of light in the direction of light path conversion (shorter side direction of the image display element).

As described above, in the present embodiment, the light path of a light flux is converted by a predetermined angle within the first lens set 0. Here, the following two methods described below are available for the conversion of the light path.

For example, the display region of the liquid crystal panel block (light valve block 70) has a rectangular shape having a pair of longer sides and a pair of shorter sides in a corresponding relationship to an aspect ratio of an image.

Therefore, when light path conversion is performed by means of the bending mirror M, if the liquid crystal panel block is taken as a reference, then a technique of converting the light path along the longer side direction of the liquid crystal panel block and another technique of converting the light path along the shorter side direction of the liquid crystal panel block are available.

In the present embodiment, the technique of converting the light path along the longer side direction of the liquid crystal panel block (light valve block 70) is implemented by the structure of the projection lens 20 described hereinabove with reference to FIG. 14 while the technique of converting the light path along the shorter side direction of the liquid crystal panel block (light valve block 70) is implemented by the structure of the projection lens 20 described hereinabove with reference to FIG. 13.

It is to be noted that also the shape of the bending mirror M shown in FIGS. 13 and 14 is a rectangular shape having a pair of longer sides and a pair of shorter sides in a corresponding relationship to the shape of the display region of the liquid crystal panel block (light valve block 70). Then, as a positional state of the bending mirror M, the bending mirror M is disposed, in FIG. 13, such that the light path is converted along the shorter side direction of the bending mirror M and is disposed, in FIG. 14, such that the light path is converted along the longer side direction of the bending mirror M.

In the present embodiment, miniaturization, for example, of the cabinet of the projection display apparatus can be achieved in whichever one the longer side direction and the shorter side direction of the liquid crystal panel block the light path is converted. However, where the configuration of the projection display apparatus shown in FIG. 1 is used, it is advantageous to perform the light path conversion along the longer side direction of the liquid crystal panel block.

The reason is such as described below.

In the projection display apparatus 500 having the configuration shown in FIG. 1, a light flux of modulated image light incoming to the projection lens 20 from the liquid crystal panel block is first reflected by the bending mirror M in the projection lens 20 to convert the light path thereof. Then, the light flux is reflected by the bending mirror 504 provided in the cabinet 501 of the projection display apparatus to convert the light path thereof so that the light is projected on the screen 21.

The modulated image light from the liquid crystal panel block is projected in this manner on the screen through the two mirrors having such a positional relationship as seen in FIG. 1. Thereupon, the image is rotated by 90° in the course from the liquid crystal panel block to the screen 21.

Accordingly, in the optical unit 503 of the projection apparatus 502, the liquid crystal panel block is disposed such that the longer side direction thereof (horizontal direction of the image) may be the vertical direction. Consequently, the image is finally displayed in an appropriate state wherein the longer side direction thereof coincides with the horizontal direction on the screen 21. Together with this, also the other various optical elements which form the projection apparatus 502 are disposed such that the longer side thereof coincides with the vertical direction.

Therefore, in the present embodiment, the light path of a light flux is converted along the longer side direction of the optical unit 503 wherein the longer side directions of the liquid crystal panel block and the other optical elements coincide with the vertical direction as described above.

In this instance, the conversion of the light path is performed in such a manner as seen in FIG. 1. In particular, the light path is converted such that it is directed upwardly with respect to the optical unit 503 of the projection apparatus 502.

Here, if the projection apparatus 502 is disposed such that the longer side directions of the liquid crystal panel block and the other optical elements coincide with the vertical direction, since the shorter side direction is the horizontal direction, the width W of the optical unit 503 of the projection apparatus 502 can be reduced readily when compared with that in an alternative case wherein the projection apparatus 502 is disposed such that the shorter side directions of the components coincide with the vertical direction. Further, depending upon the arrangement of the internal components, the components themselves can be miniaturized.

Since miniaturization of the optical unit 503 of the projection apparatus 502 can be achieved advantageously, miniaturization (particularly reduction in the depthwise direction) of the projection display apparatus 500 can be further promoted.

On the other hand, in the projection display apparatus 500A of the configuration shown in FIG. 2, a light flux of modulated image light incoming to the projection lens 20 from the liquid crystal panel block is first reflected by the bending mirror M in the projection lens 20 to convert the light path thereof. Then, the light path of the light flux is converted by the bending mirror 504 provided in the cabinet 501 of the projection display apparatus 500.

Accordingly, in this instance, the light path conversion in the projection lens 20 along the shorter side directions of the liquid crystal panel block and the other optical elements is advantageous in terms of the reduction the width W of the optical unit 503 of the projection apparatus 502.

In particular, the projection lens 20 of the present embodiment is configured such that, for the projection display apparatus shown in FIG. 1, the light path conversion is performed along the longer side direction of the liquid crystal panel block (light valve block) whereas, for the projection display apparatus shown in FIG. 2, the light path conversion is performed along the shorter side direction of the liquid crystal panel block (light valve block). In short, for the projection display apparatus shown in FIG. 1, the projection lens 20 having the light path conversion structure shown in FIG. 14 is adopted whereas, for the projection display apparatus shown in FIG. 2, the projection lens 20 having the light path conversion structure shown in FIG. 13 is adopted.

In this regard, a countermeasure is taken so that the projection display apparatus of both types may be miniaturized as far as possible.

It is to be noted that, as the means for converting the light path in the projection lens 20, for example, it is possible to adopt a prism in addition to the configuration which employs a mirror such as the bending mirror M. In this instance, since the light path length in the prism is given as a value obtained by dividing the length of the prism along the light path by a refractive index of the prism and the physical length of the first A lens set 100 and the first B lens set 200 can be increased as much, replacement between a bending mirror and a prism is possible.

Further, where a liquid crystal panel block is used for a projection apparatus as in the present embodiment, the light to be used actually is one of lights of different polarization directions, that is, an S polarized light component or a P polarized light component as well known in the art.

Therefore, where it is considered to provide a coating on the bending mirror M or the prism which converts the light path within the projection lens 20 in order to obtain a light reflection effect, the coating should be provided so that it has a high reflection factor only with regard to one of the opposite polarization directions, that is, the S polarized light component or the P polarized light component, in accordance with the polarization plane of a light flux to be emitted finally from the light synthesis element (19, 19A, 19B) of FIGS. 3 to 5. Conversely speaking, the light path conversion means in the present embodiment need not necessarily have a configuration which can totally reflect both of the S polarized light component and the P polarized light component. Thus, for example, the image light can be reflected with a higher efficiency as much, and as a result, reduction of the cost can be anticipated as much.

3-2. Conditional Expressions

The projection lenses 20 in the first to third embodiments having the configuration described above satisfy the following conditional expressions (1) to (4).

In particular, where the focal length of the entire system is represented by FL, the back focus by FB, the front side focal position of the second lens set 300 by FFP2, the distance between the iris 400 and the second lens set 300 by Dst, and the air converted distance between the first lens set 0 and the second lens set 300 on the optical axis by D2, $$FB/FL > 2.2 \quad (1)$$

$$0.59 < |FFP2/Dst| < 0.96 \quad (2)$$

$$3.75 < D2 \quad (3)$$

are satisfied and further, where the focal length of the first A lens set 100 is represented by Fa1, $$1.74 < |FA1/FL1| < 2.54 \quad (4)$$

is satisfied.

Now, the conditional expressions given above are explained.

For example, in the present embodiment, the bending mirror M serving as light path conversion means is built in the projection lens 20, and to this end, a long air distance is required. Further, as can be seen also from the configurations shown in FIGS. 3 to 5, it is necessary to use an optical element for color synthesis such as a dichroic mirror or a dichroic prism in the projection display apparatus. Therefore, a long back focus is required for the projection lens 20, and it is necessary for the projection lens 20 to have a lens configuration of the retrofocus type having a high telecentric property.

Where the present embodiment satisfies the conditional expressions (1), (2) and (3), a projection lens having a long air distance and a long back focus described above can be produced and besides a lens configuration of the retrofocus type having a high telecentric property can be obtained.

The conditional expression (1) restricts the length of the back focus. If the length of the back focus is smaller than the length defined by the conditional expression (1), then the space for the color synthesis system disappears. In other words, the color synthesis prism cannot be accommodated.

The conditional expression (2) defines the position of the iris 400 and the range of the telecentric property. If the position of the iris 400 comes out of the range of the conditional expression (2), then the telecentric property becomes weak. In other words, an excessively great angle is provided to a principal light ray incoming to the panel surface, and consequently, a uniform contrast cannot be obtained.

The conditional expression (3) defines the space in which the light path conversion means should be placed on the optical axis. In particular, the conditional expression (3) defines the space in which the bending mirror M can be disposed between the first A lens set 100 and the first B lens set 200. If the space is smaller than the lower limit value given by the conditional expression (3), then the diameter of the first A lens set becomes excessively great. On the other hand, if the space is greater than the upper limit value, then the positive refractive power of the first B lens set becomes excessively great, and it becomes difficult to correct the astigmatism or the distortion aberration.

Further, in the present embodiment, the lenses which form the first A lens set 100 include a meniscus lens 101 which is convex to the screen side and an aspheric lens 102 in the form of a meniscus lens convex to the screen side similarly and having an aspheric surface at a lens face (r4) thereof on the panel side. In other words, all of the lenses have a meniscus lens shape convex to the screen side and having a negative refractive power so that the entire first A lens set 100 has a negative refractive power. If off-axis light fluxes are introduced so as to pass different portions of such a first A lens set 100 having a negative refractive power as described above, then the refracted states of the light rays are different little by little from each other. Therefore, the light fluxes can propagate through the second lens set 300 while appearance of aberrations caused by the surfaces is reduced.

The conditional expression (4) defines the range of the negative refractive power of such a first A lens set 100 as described above.

If the negative refractive power of the first A lens set 100 exceeds an upper limit value given by the conditional expression (4), then the diameter of the first A lens set 100 becomes excessively great, and therefore, the positive refractive index of the second lens set 300 and the succeeding elements must be increased. This makes correction of various aberrations caused thereby difficult.

On the other hand, if the negative refractive power of the first A lens set 100 becomes lower than the lower limit value, then the curvature of the lens becomes excessively strong. This is not preferable because it becomes difficult to use the second lens set 300 to correct aberrations caused by the first A lens set 100.

3-3. Numerical Value Embodiments, etc.

Numerical value embodiments of the projection lens 20 of the first to fifth embodiments described hereinabove are given in FIGS. 15A to 19D.

In the figures A of FIGS. 15A to 19D, the "surface number" is the surface number (lens surface number) of a lens surface as counted from the screen side, and this corresponds to the lens surface indicated by each of the reference characters r1 to r21 (r19) in FIGS. 8 to 12. Then, the radius of curvature of the lens surface, lens surface distance, refractive index of the lens with respect to the wavelength 587.56 mm and Abbe number of the lens are indicated corresponding to each of the lens surface numbers. Further, the reference character FL outside the tables of the figures A among FIGS. 15A to 19D indicates the focal length of the projection lens, M the projection magnification, FNo the F number, and 2W the angle of view.

Meanwhile, the surface shapes (aspheric coefficients) of aspheric surfaces shown in FIGS. 15B to 15C and the figures B, C and D among FIGS. 16A to 19D are represented, where, in a rectangular coordinate system (X, Y, Z) wherein the center of the surface is set as the origin and the direction of the optical axis is set to Z, r represents the central radius of curvature, K a conical constant and A4, A6, A8 and A10 represent the fourth, sixth, eighth and tenth order aspheric coefficients, respectively, by $$Z = \frac{(h^2/r)}{1+\sqrt{1-(1+K)\cdot(h^2/r^2)}} + \sum_{j=2}^{5} A_{2j} \cdot h^{2j}$$

$$h = \sqrt{X^2 + Y^2}$$

FIG. 20 illustrates particular examples of calculation values based on the conditional expressions (1) to (4) described hereinabove in the first to fifth embodiments.

Further, FIGS. 21 to 25 indicate the spherical aberrations, astigmatisms and distortion aberrations regarding the projection lens 20 of the first to fifth embodiments.

It is to be noted that, in order to obtain results illustrated in various aberration diagrams shown in the figures, though not illustrated in the numerical value embodiments, parallel flat plates having a predetermined central surface distance are placed as the light synthesis elements 19, 19A and 19B shown in FIGS. 3 to 5, respectively, which are prisms for performing color synthesis in performing the calculation. However, such numerical values regarding the color synthesis prisms do not have an influence on the configuration of the projection lens according to the present invention.

Further, the actual structures of the projection lenses as the first to fifth embodiments described above are not limited to those illustrated in FIGS. 8 to 12, and as far as the conditional expressions described hereinabove are satisfied, the number of lenses which form each lens set and so forth may be modified.

Further, while, in the embodiment described above, the projection lens of the present invention is provided in a projection apparatus of a projection display apparatus of the back projection type which utilizes a liquid crystal panel or a light valve as a two-dimensional image display element, it is not limited to this. For example, the projection lens of the present invention can be applied also to projection apparatus other than that of the back projection type such as a projection apparatus of the front projection type, and further to photographic lenses of the wide angle type such as photographic object lenses for a single-lens reflect camera, a camera for industrial use and a camera for an electronic photograph and besides to projection lenses for a projector television which makes use of a CRT.

Further, according to the present invention, where the first B lens set is formed as a laminated lens, appearance of various aberrations such as a chromatic aberration in the first lens set can be suppressed, and the degree of aberration correction by the second lens set can be reduced. Particularly, it becomes possible to perform appropriate color correction.

Further, while, in the present invention, the light path conversion means is configured so that one of a P polarized light component and an S polarized light component is reflected intensely, for example, where an optical system of a projection apparatus which includes the projection lens utilizes a polarization plane of one of the directions, that is, the P polarized light component or the S polarized light component, it is not necessary to intentionally adopt a configuration for reflecting light in an averaged manner between the polarization planes of the P polarized light component and the S polarized light component. Accordingly, in such an instance, if the present invention can be applied to form the light path conversion means so that it reflects only a polarized light component to be utilized by the optical system, then image light can be reflected in a high efficiency.

In short, according to the present invention, a projection lens for performing light path conversion in the inside thereof is implemented which has a long back focus and a strong telecentric property and can, particularly in a projection apparatus which uses a liquid crystal panel, project light with a high contrast and besides exhibits reduced aberrations beginning with a distortion aberration.

What is claimed is:

1. A projection lens in a projection system receives a synthesized light formed by separating light from a light source into a plurality of color light beams, forming each of the separated color light beams as an image color light beam by a rectangular image formation element and synthesizing the image color beams and projects the received synthesized light in an enlarged scale on a screen, wherein said projection lens is formed as a projection lens of a retrofocus type wherein a first lens set having a negative refractive power and light path conversion means built therein, an iris, and a second lens set having a positive refractive power are disposed in order from the screen to the image formation element, said first lens set includes a first A lens set having a negative refractive power and including at least one aspheric lens, said light path conversion means, and a first B lens set having a positive refractive power, and said second lens set includes an aspheric lens, lenses in said first A lens set have an outer diameter with a portion thereof cut off outside an effective light ray in a direction of light path conversion, the direction of light path conversion by said light path conversion means is a direction of a shorter side of the rectangular image formation element, and where a focal length of the projection system is represented by FL, a back focus by FB, a front side focal position of said second lens set by FFP2, a distance between said iris and said second lens set by Dst, and a spatial converted distance on an optical axis between said first lens set and said second lens set by D2, expressions:

$FB/FL > 2.2$ $0.59 < |FFP2/Dst| < 0.96$ $3.75 < D2$ are satisfied.

2. The projection lens according to claim 1, wherein, said first A lens set includes two or more lenses, and all of the two or more lenses are meniscus lenses each having a negative refractive power and convex to the screen side, and where the focal length of said first A lens set is represented by Fa1, an expression:

$1.74 < |Fa1/FL| < 2.54$ is satisfied.

3. The projection lens according to claim 1, wherein said first B lens set comprises a laminated lens.

4. The projection lens according to claim 1, wherein said second lens set includes glass lenses including at least a first positive lens, a second positive lens and a laminated lens disposed in order from a side nearest to the image formation element.

5. The projection lens according to claim 1, wherein said second lens set includes glass lenses including at least a first positive lens, a laminated lens and a second positive lens disposed in order from a side nearest to the image formation element.

6. The projection lens according to claim 1, wherein said second lens set includes glass lenses including at least a laminated lens, a first positive lens and a second positive lens disposed in order from the screen such that a central spatial distance greatest in said second lens set is provided between the first and second positive lenses.

7. The projection lens according to claim 1, wherein said second lens set includes glass lenses including at least a first positive lens, a laminated lens and a second positive lens disposed in order from the screen side, the second positive lens having a highest refractive power in said second lens set.

8. The projection lens according to claim 1, wherein one of said aspheric lens and lenses in said second lens set are positioned nearer to the screen.

9. The projection lens according to claim 1, wherein one of said aspheric lens and lenses in said second lens set are positioned nearer to the image formation element side.

10. The projection lens according to claim 1, wherein one of said aspheric lens and lenses in said second lens set are a concavo-concave lens having a negative refractive power.

11. The projection lens according to claim 1, wherein said light path conversion means includes means to perform one of reflecting a P polarized light component more intensely than an S polarized light component and reflecting an S polarized light component more intensely than a P polarized light component.

12. A projection lens in a projection system receives a synthesized light formed by separating light from a light source into a plurality of color light beam, forming each of the separated color light beams as an image color light beam by a rectangular image formation element and synthesizing the image color beams and projects the received synthesized light in an enlarged scale on a screen, wherein said projection lens is formed as a projection lens of a retrofocus type wherein a first lens set having a negative refractive power and light path conversion means built therein, an iris, and a second lens set having a positive refractive power are disposed in order from the screen to the image formation element, said first lens set includes a first A lens set having a negative refractive power and including at least one aspheric lens, said light path conversion means, and a first B lens set having a positive refractive power, and said second lens set includes an aspheric lens, lenses in said first A lens set have an outer diameter with a portion thereof cut off outside an effective light ray in a direction perpendicular to a direction of light path conversion, the direction of light path conversion by said light path conversion means is a direction of a longer side of the rectangular image formation element, and where a focal length of the projection system is represented by FL, a back focus by FB, a front side focal position of said second lens set by FFP2, the distance between said iris and said second lens set by Dst, and a spatial converted distance on an optical axis between said first lens set and said second lens set by D2, expressions:

$$FB/FL > 2.2$$
$$0.59 < |FFP2/Dst\uparrow| < 0.96$$
$$0.75 < D2$$

are satisfied.

13. The projection lens according to claim 12, wherein said first A lens set includes two or more lenses, and all of the two or more lenses are meniscus lenses each having a negative refractive power and convex to the screen side, and where the focal length of said first A lens set is represented by Fa1, an expression:

$$1.74 < |FA1/FL| < 2.54$$

is satisfied.

14. The projection lens according to claim 12, wherein said first B lens set a laminated lens.

15. The projection lens according to claim 12, wherein said second lens set includes glass lenses including at least a first positive lens, a second positive lens and a laminated lens disposed in order from side nearest to the image formation element.

16. The projection lens according to claim 12, wherein said second lens set includes glass lenses including at least a first positive lens, a laminated lens and a second positive lens disposed in order from a side nearest to the image formation element.

17. The projection lens according to claim 12, wherein said second lens set includes glass lenses including at least a laminated lens, a first positive lens and a second positive lens disposed in order from the screen such that a central spatial distance greatest in said second lens set is provided between the first and second positive lenses.

18. The projection lens according to claim 12, wherein said second lens set includes glass lenses including at least a first positive lens, a laminated lens and a second positive lens disposed in order from the screen, the second positive lens having a highest refractive power in said second lens set.

19. The projection lens according to claim 12, wherein one of said aspheric lens and lenses in said second lens set are positioned nearer to the screen.

20. The projection lens according to claim 12, wherein one of said aspheric lens and lenses in said second lens set are positioned nearer to the image formation element.

21. The projection lens according to claim 12, wherein one of said aspheric lens and lenses in said second lens set are a concavo-concave lens having a negative refractive power.

22. The projection lens according to claim 12, wherein said light path conversion means includes means to perform one of reflecting a P polarized light component more intensely than an S polarized light component and reflecting an S polarized light component more intensely than a P polarized light component.

23. A projection display apparatus comprising:

a light source;

light separation means for separating light from said light source into a plurality of color light beams;

a rectangular image formation element for forming each of the color light beams separated by said light separation means as an image color light beam;

a color synthesis element for synthesizing the image color light beams from the image formation element;

a projection lens for receiving the light synthesized by said color synthesis element and projecting the received synthesized light in an enlarged scale; and a screen for displaying an image projected from said projection lens, wherein said projection lens is formed as a projection lens of a retrofocus type wherein a first lens set a negative refractive power and having light path conversion means built therein, an iris, and a second lens set having a positive refractive power are disposed in order from the screen to the image formation element, said first lens set includes a first A lens set having a negative refractive power and including at least one aspheric lens, said light path conversion means, and a first B lens set having a positive refractive power, and said second lens set includes an aspheric lens, lenses in said first A lens set have an outer diameter with a portion thereof cut off outside an effective light ray in a direction of light path conversion, and the direction of the light path conversion by said light path conversion means is a direction of a shorter side of the rectangular image formation element, and, where a focal length of the projection display apparatus is represented by FL, a back focus by FB, a front side focal position of said second lens set by FFP2, a distance between said iris and said second lens set by Dst, and a spatial converted distance on an optical axis between said first lens set and said second lens set by D2, expressions:

$FB/FL > 2.2$ $0.59 < |FFP2/Dst| > 0.96$ $3.75 < D2$ are satisfied.

24. The projection display apparatus according to claim 23, wherein said first A lens set includes two or more lenses, and all of the two or more lenses are meniscus lenses each having a negative refractive power and convex to the screen side, and where the focal length of said first A lens set is represented by Fa1, an expression:

$1.74 > |Fa1/FL \uparrow < 2.54$ is satisfied.

25. A projection display apparatus comprising:

a light source;

light separation means for separating light from said light source into a plurality of color light beams;

a rectangular image formation element for forming each of the color lights separated by said light separation means as an image color light;

a color synthesis element for synthesizing the image color light beams from the image formation element;

a projection lens for receiving the light synthesized by said light synthesis element and projecting the received synthesized light in an enlarged scale; and a screen for displaying an image projected from said projection lens, wherein said projection lens is formed as a projection lens of a retrofocus type wherein a first lens set a negative refractive power and having light path conversion means built therein, an iris, and a second lens set having a positive refractive power are disposed in order from the screen to the image formation element, said first lens set includes a first A lens set having a negative refractive power and including at least one aspheric lens, said light path conversion means, and a first B lens set having a positive refractive power, and said second lens set includes an aspheric lens, lenses in said first A lens set have an outer diameter with a portion thereof cut off outside an effective light ray in a direction of light path conversion, and the direction of the light path conversion by said light path conversion means is a direction of a longer side of the rectangular image formation element, and, where a focal length of the projection display apparatus is represented by FL, a back focus by FB, a front side focal position of said second lens set by FFP2, the distance between said iris and said second lens set by Dst, and a spatial converted distance on an optical axis between said first lens set and said second lens set by D2, expressions:

$FB/FL > 2.2$ $0.59 < |FFP2/Dst| < 0.96$ $3.75 < D2$ are satisfied.

26. The projection display apparatus according to claim 25, wherein said first A lens set includes two or more lenses, and all of the two or more lenses are meniscus lenses each having a negative refractive power and convex to the screen side, and that, where the focal length of said first A lens set is represented by Fa1, an:

$1.74 < |Fa1/FL| < 2.54$ is satisfied.

* * * * *